United States Patent
Kurzius et al.

(10) Patent No.: US 6,385,620 B1
(45) Date of Patent: May 7, 2002

(54) SYSTEM AND METHOD FOR THE MANAGEMENT OF CANDIDATE RECRUITING INFORMATION

(75) Inventors: L. Rex Kurzius, Plano; Jason T. Johnston, The Colony, both of TX (US)

(73) Assignee: psiSEARCH,LLC, Dallas, TX (US)

( * ) Notice: Subject to any disclaimer, the term of this patent is extended or adjusted under 35 U.S.C. 154(b) by 0 days.

(21) Appl. No.: 09/375,116

(22) Filed: Aug. 16, 1999

(51) Int. Cl.[7] .............................................. G06F 17/30
(52) U.S. Cl. .......................... 707/104.1; 705/1; 705/8; 705/9
(58) Field of Search .............................. 434/219; 705/1, 705/7–10, 27, 35–38; 707/104, 10, 10.8, 104.1; 514/510, 319, 724; 435/325, 6, 7.1, 69.1, 29, 5, 366

(56) References Cited

U.S. PATENT DOCUMENTS

| | | | |
|---|---|---|---|
| 5,164,897 A | * 11/1992 | Clark et al. ..................... | 705/1 |
| 5,197,004 A | * 3/1993 | Sobotka et al. ................ | 705/8 |
| 5,758,324 A | * 5/1998 | Hartman et al. ............... | 705/1 |
| 5,832,497 A | * 11/1998 | Taylor ......................... | 707/104 |
| 5,884,270 A | * 3/1999 | Walker et al. ................. | 705/1 |
| 5,918,207 A | * 6/1999 | McGovern et al. ............ | 705/1 |
| 5,978,768 A | * 11/1999 | McGovern et al. ............ | 705/1 |

* cited by examiner

Primary Examiner—John Breene
Assistant Examiner—Mohammad Ali
(74) Attorney, Agent, or Firm—Baker Botts L.L.P.

(57) ABSTRACT

A system for automated candidate recruiting using a network includes a candidate web engine operable to communicate with the network and to present a candidate survey form to a client of the network, the candidate web engine further operable to receive candidate qualification data from the client that is entered in the form. The system further includes a candidate mapping engine in communication with the candidate web engine, the candidate mapping engine operable to receive the candidate qualification data from the candidate web engine and generate at least one candidate identifier in response to parsing the candidate qualification data. The candidate mapping engine is further operable to index the at least one candidate identifier in response to the parsed candidate qualification data. The at least one candidate identifier is linked to a candidate record. The candidate record stores the candidate qualification data.

23 Claims, 15 Drawing Sheets

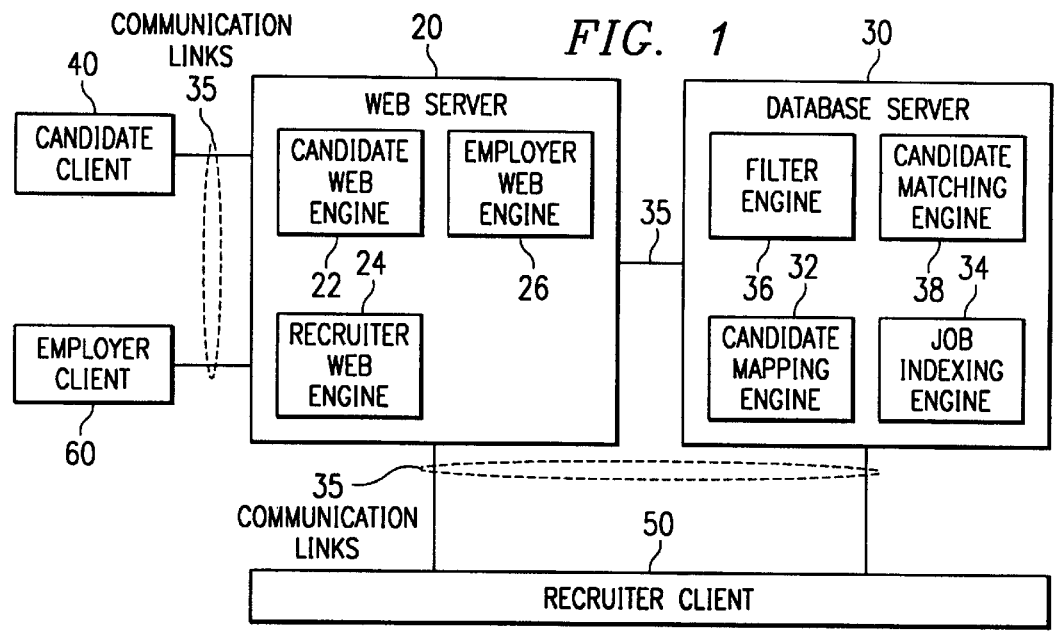
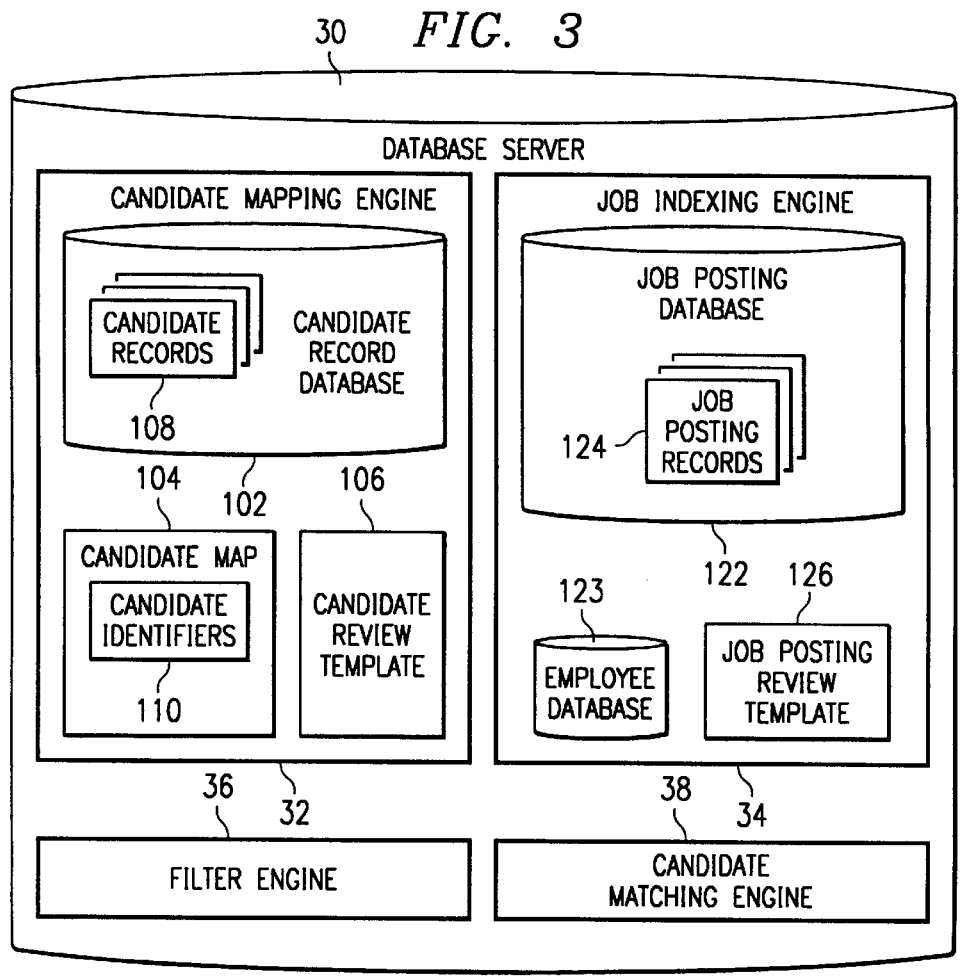

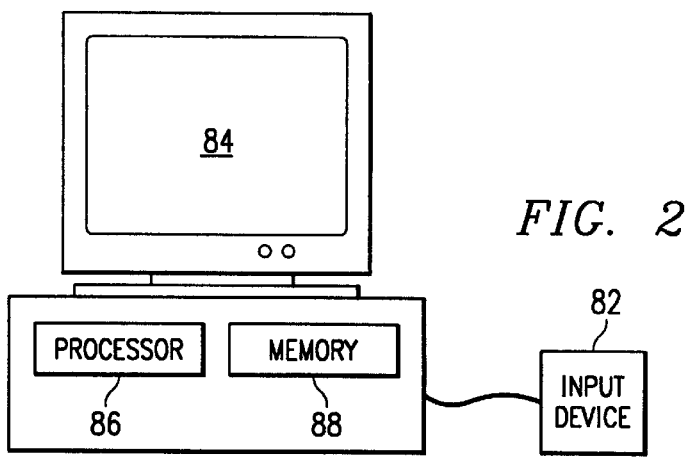

FIG. 2

| | 402 | 404 | 406 | 408 |
|---|---|---|---|---|
| | | CANDIDATE MAP | | |
| | GEOGRAPHIC LOCATION | TEXAS | DALLAS/FORT WORTH HOUSTON AUSTIN SAN ANTONIO | |
| | | CALIFORNIA | SAN DIEGO SAN FRANCISCO LOS ANGELES SACRAMENTO | DAVIS, THOMAS ELLORY, MEGAN LI, MARK COOPER, SUSAN |
| | SOFTWARE | JAVA CORBA SQL HTML | 0-2 YEARS EXPERIENCE 2-5 YEARS EXPERIENCE 5+ YEARS EXPERIENCE MANAGERIAL/SUPERVISORY | ADAMS, JOHN BEST, MARK COOPER, SUSAN DRYER, KEVIN |
| | PROJECT MANAGEMENT | WEB DESIGN DATABASE DESIGN OBJECT ORIENTED NOVELL NETWORKS | | ANDERSON, WILLIAM BROCK, JENNIFER WEST, ALLISON |

Contact Information

Home Address — Street: [1408] City: [1408] State: [AK] [1406] Zip:(5)

Preferred Work Locations — First Choice: Second Choice: Third Choice:

Will you relocate? [Yes]

Can you give written evidence of a right to work in the US? [-Select-]

Contact Information:
- Home phone: | Office phone:
- Home FAX: | Office FAX:
- Cell phone: | Pager:
- Primary email: | Secondary email:

*I prefer to be contacted via my [Home phone]

Reference — How did you find out about us (ex: recruiter's name)?

Background Information (education & work history optional if resume included below)

Education

| # | Education Level | Major | University | Did you Graduate? | Year Graduate? |
|---|---|---|---|---|---|
| 1. | N/A | | | -Select- | 1991 |
| 2. | N/A | | | -Select- | 1991 |
| 3. | N/A | | | -Select- | 1991 |

Work History (Last 3 Employers, starting with most recent)

| Company | Dates | Month | Year | Title | Start Salary (ex: 53,000) |
|---|---|---|---|---|---|
| | From / To | 01 / 01 | 1991 / 1991 | | |
| | From / To | 01 / 01 | 1991 / 1991 | | |
| | From / To | 01 / 01 | 1991 / 1991 | | |

Other Employment Information

Current Salary: (ex: 57,500) Desired Salary: [$20000-$25000]  1404

Career Goals/Other Comments:

FIG. 14b

Skill Inventory: (Choose skill keywords. Hold down the CTRL key to select multip

| Business Related Skill Keywords | Software Related Skill Keywords | Hardware Related Skill Keywords |
|---|---|---|
| ACCOUNT EXECUTIVE<br>ACCOUNT MANAGER<br>BOOCH<br>BUSINESS ANALYST<br>CASE<br>CASE TOOLS<br>CUSTOMER SERVICE<br>DIRECTOR<br>FOUNDATION   1418<br>FUSION<br>GANE & SARSON<br>IDEF<br>INFORMATION ENGINEERING<br>INSTRUCTOR<br>JAMES MARTIN | 3SHARE<br>3+ OPEN<br>ABAP (SAP)<br>ACCESS   1420<br>ACCOUNTING<br>ACP/TPF<br>ACTIVE SERVER PAGES<br>ADA<br>ADABAS<br>ADSM<br>AIX<br>ALC<br>APPLE<br>APPLESHARE<br>APPLICATION MANAGEMENT SOFTWARE | 10 BASE T<br>100 BASE T<br>APPLE MACINTOSH<br>APPLE TALK<br>ARCHITECTURE<br>ARCNET<br>AS/400<br>ATM   1422<br>AT&T<br>BISYNC/ASYNC<br>BRIDGES<br>CDMA<br>CITRIX WINFRAME<br>CLIENT/SERVER<br>CMIP |

Additional Skills (list any skills not found in above list-separate with commas):   1424

Resume:

Use the Browse button to attach word 6.0 or text format resume here:

Or Paste Content Into the Field Below:

*FIG. 15*

Skill Details

| Skill | Years | Proficiency |
|---|---|---|
| ACCOUNT EXECUTIVE | -0- | -CHOOSE EXPERIENCE LEVEL- |
| ACCOUNT MANAGER | -0- | -CHOOSE EXPERIENCE LEVEL- |
| CASE TOOLS | -0- | -CHOOSE EXPERIENCE LEVEL- |
| FOUNDATION | -0- | -CHOOSE EXPERIENCE LEVEL- |
| IDEF | -0- | -CHOOSE EXPERIENCE LEVEL- |
| ACCESS | -0- | -CHOOSE EXPERIENCE LEVEL- |
| ACCOUNTING | -0- | -CHOOSE EXPERIENCE LEVEL- |
| ADSM | -0- | -CHOOSE EXPERIENCE LEVEL- |
| APPLESHARE | -0- | -CHOOSE EXPERIENCE LEVEL- |
| APPLE MACINTOSH | -0- | -CHOOSE EXPERIENCE LEVEL- |
| ARCHITECTURE | -0- | -CHOOSE EXPERIENCE LEVEL- |
| ATM | -0- | -CHOOSE EXPERIENCE LEVEL- |
| AT&T | -0- | -CHOOSE EXPERIENCE LEVEL- |
| CLIENT/SERVER | -0- | -CHOOSE EXPERIENCE LEVEL- |
| CMIP | -0- | -CHOOSE EXPERIENCE LEVEL- |

Would you like to receive free e-mail notifications of new job postings that match your skills?   ○ Yes  ◉ No

~1510

```
JOB POSTING
TITLE:
DESCRIPTION:

STATUS:
REQUIRED SKILLS:

PREFERRED SKILLS:

SOFT SKILLS:

SALARY RANGE:

EDUCATION REQUIREMENTS:

LOCATION:
LENGTH OF CONTRACT:
DATE POSTED:
```

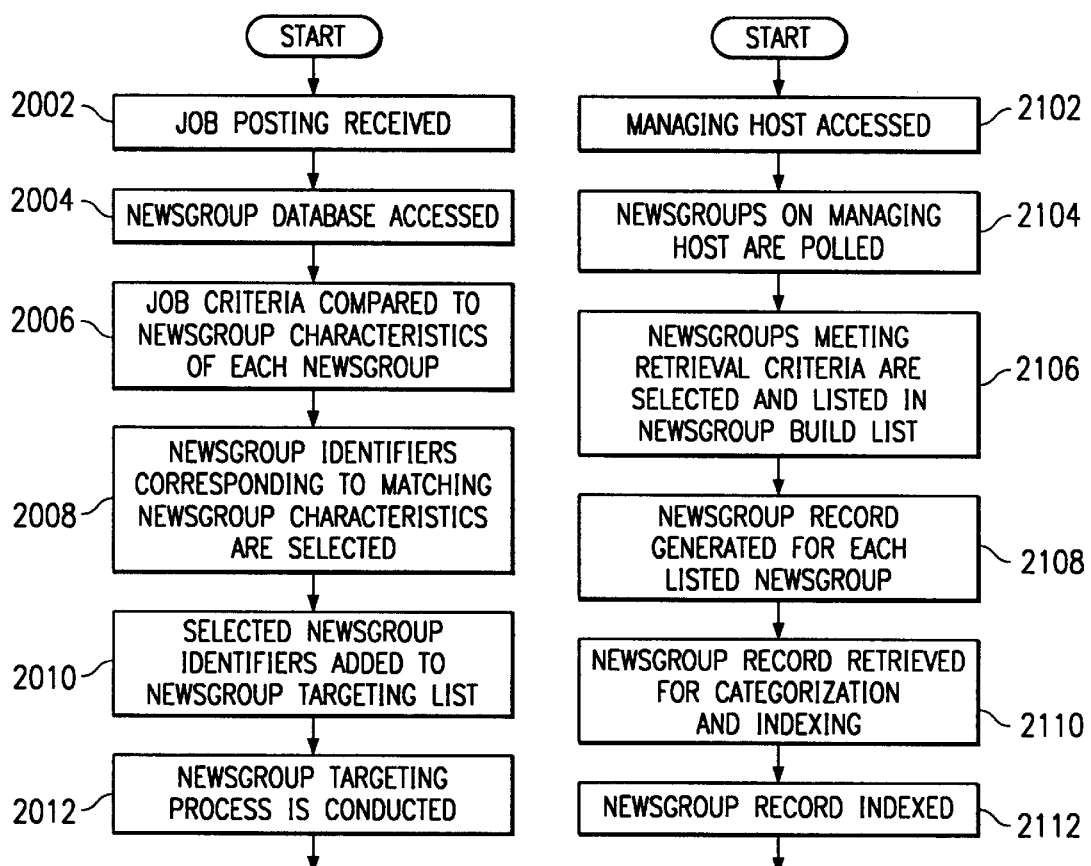
FIG. 20
FIG. 21
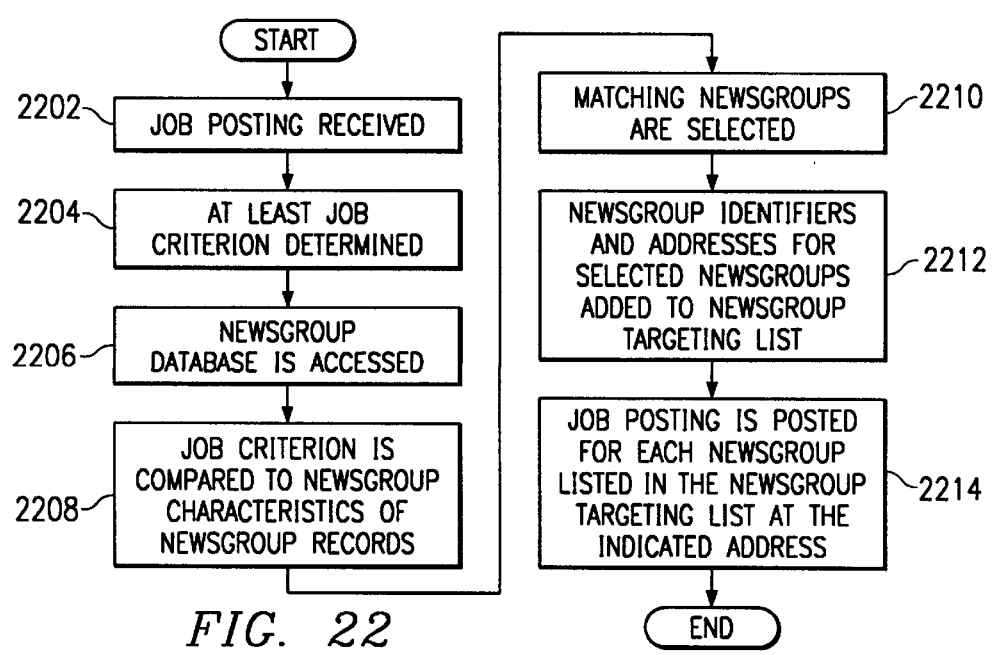
FIG. 22

SYSTEM AND METHOD FOR THE MANAGEMENT OF CANDIDATE RECRUITING INFORMATION

CROSS REFERENCE TO RELATED APPLICATIONS

This application is related to the following applications which are incorporated herein by reference: U.S. application Ser. No. 09/375,117, filed Aug. 16, 1999, and entitled SYSTEM AND METHOD FOR AUTOMATED CANDIDATE RECRUITING, and U.S. application Ser. No. 09/374,635, filed Aug. 16, 1999, and entitled SYSTEM AND METHOD FOR JOB TARGETING.

TECHNICAL FIELD OF THE INVENTION

This invention relates in general to the field of employment software, and more particularly to a system and method for the management of candidate recruiting information.

BACKGROUND OF THE INVENTION

Current systems and methods utilized by employers and recruiters to receive and process candidate qualification data still largely rely on receiving paper copies of resumes, whether these are received via mail, hand delivery, or even printed directly from a web site on the Internet. Because of this reliance, and in order to obtain electronic versions of the resumes, many companies today process resumes by hand-keying them into a word-processing or other data entry application, or alternatively on scanner technology that is not always accurate or reliable.

Additionally, many systems that require keying or scanning of candidate resumes do not allow for efficient processing of candidate qualifications. For example, many companies review paper resumes by hand and only generate electronic versions of those resumes in which they have interest. As a result, much of the review and processing of candidates for job positions is done manually by recruiters or other human resources personnel who spend excessive amounts of time turning the pages of resumes looking for a candidate that jumps out at them. Such an approach, while clearly not very efficient, is additionally not the most objective means of selecting candidates for a particular job. Some resumes get lost, others get accidentally skipped over in review, while still others are presented in a format that is not conducive to easy review. In any case, such systems do not allow for easy organization and classification of candidate resumes for review and selection.

SUMMARY OF THE INVENTION

In accordance with the present invention, a system and method for the management of candidate recruiting are disclosed that substantially reduce disadvantages and problems associated with previously developed candidate recruiting systems.

According to one aspect of the present invention, a system for automated candidate recruiting using a network is provided that includes a candidate web engine operable to communicate with the network and to present a candidate survey form to a client of the network, the candidate web engine further operable to receive candidate qualification data from the client that is entered in the form. The system further includes a candidate mapping engine in communication with the candidate web engine, the candidate mapping engine operable to receive the candidate qualification data from the candidate web engine and generate at least one candidate identifier in response to parsing the candidate qualification data. The candidate mapping engine is further operable to index the at least one candidate identifier in response to the parsed candidate qualification data. The at least one candidate identifier is linked to a candidate record. The candidate record stores the candidate qualification data.

According to another aspect of the present invention, a system for automated candidate recruiting on a network is provided that includes a computer-readable medium and a computer program encoded on the computer-readable medium, the computer program operable to be executed on a computer, the computer program further operable to parse candidate qualification data in response to receiving a candidate profile. The computer program is further operable to store the received candidate profile in a candidate record and generate a plurality of candidate identifiers associated with the parsed candidate qualification data, each candidate identifier being linked to the candidate record. The computer program is also operable to compare the candidate qualification data to a candidate map and assign each candidate identifier to one of a plurality of categories of the candidate map in response to the compared candidate qualification data.

According to a further aspect of the present invention, a method of automated candidate recruiting over a network is provided that includes parsing candidate qualification data from a candidate profile in response to receiving the candidate profile over the network. The method also includes storing the received candidate profile in a candidate record and generating a plurality of candidate identifiers associated with the parsed candidate qualification data, each candidate identifier being linked to the candidate record. The method further includes comparing the candidate qualification data to a candidate map and assigning one of the candidate identifiers to a category of the candidate map in response to the compared candidate qualification data.

The present invention provides several technical advantages. A technical advantage of embodiments of the present invention is that they reduce problems associated with prior candidate recruiting systems. Another technical advantage of embodiments of the present invention is that they do not require keying or scanning of resumes before they can process candidate qualification data they receive from potential job applicants. A further technical advantage of embodiments of the present invention is that they allow easy classification and storage of particular candidate qualification data. Other technical advantages of particular embodiments of the invention may be readily understood from the following detailed description.

BRIEF DESCRIPTION OF THE DRAWINGS

A more complete understanding of the present invention and the advantages thereof may be understood by referring to the following description taken in conjunction with the accompanying drawings in which like reference numerals indicate like features, and wherein:

FIG. 1 illustrates a system for automated candidate recruiting and processing;

FIG. 2 illustrates one embodiment of a server or client used in the system of FIG. 1;

FIG. 3 illustrates one embodiment of the database server used in the system of FIG. 1;

FIG. 4 illustrates one embodiment of a candidate map used in the system of FIG. 1;

FIG. 14A illustrates portions of one embodiment of a candidate survey form that is presented to a candidate registering with the system;

FIG. 14B illustrates further portions of the candidate survey form illustrated in FIG. 14A;

FIG. 15 illustrates one embodiment of a candidate proficiency form that is used by a candidate to specify a level of expertise for one or more candidate qualifications;

FIG. 20 illustrates a flow chart of a method for targeting mailings of job postings to particular job candidates;

FIG. 21 illustrates a flowchart of a method for analyzing newsgroups and building a newsgroup database;

FIG. 22 is a flow chart illustrating a method used to select a newsgroup to which to send a job posting;

DETAILED DESCRIPTION OF THE INVENTION

Figure 5:
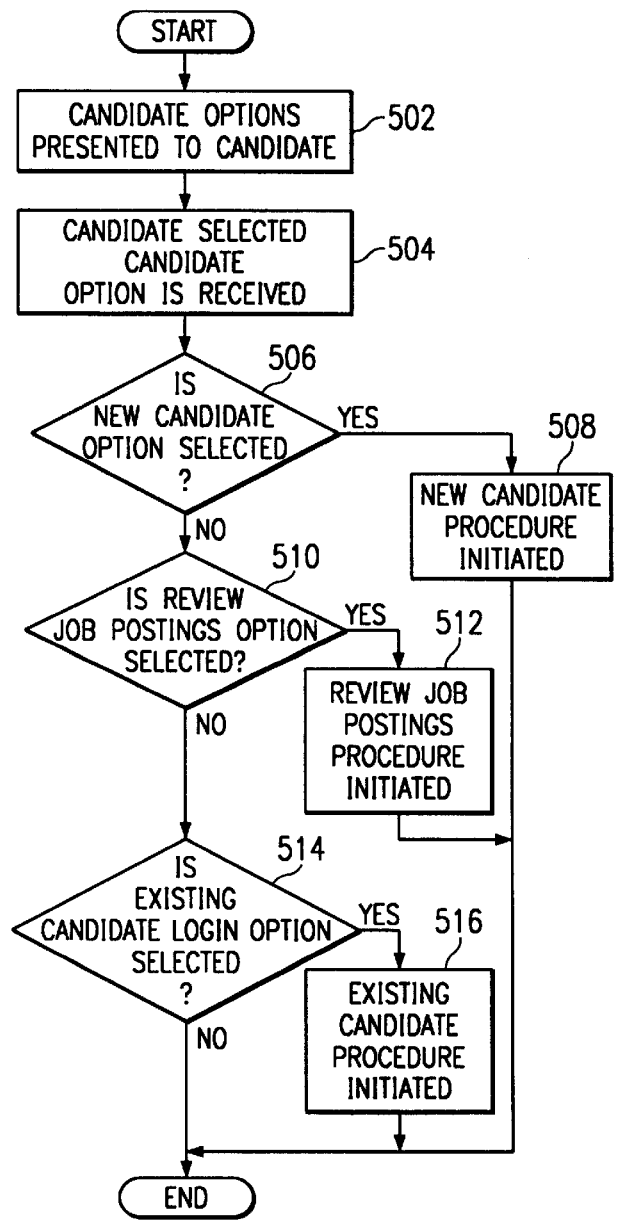
FIG. 5 illustrates a flow chart of a method for displaying recruiting options to a candidate.

FIG. 1 illustrates a system 10 for automated candidate recruiting and processing. In general, system 10 accepts electronic job postings from employers and candidate qualification data in the form of candidate profiles from potential job candidates. System 10 categorizes and indexes the postings and profiles in order to automatically match suitable candidates to suitable jobs.

System 10 includes a web server 20 in communication with a candidate client 40, a recruiter client 50, and an employer client 60. System 10 also includes a database server 30 in communication with web server 20 and recruiter client 50. Communication between clients 40, 50 and 60 and web server 20, as well as communication between web server 20, database server 30, and recruiter client 50, may be implemented using hardware and software associated with one or more communication links 35.

Although servers 20 and 30 and clients 40, 50 and 60 are referred to in the nomenclature of a client/server environment, it should be understood that each of servers 20 and 30 and clients 40, 50 and 60 may be any type of computer operating in any suitable environment that communicates using one or more communication links 35. For example, the components of system 10 may be arranged in a peer-to-peer computing environment, or other suitable environment that supports communication among different components of system 10.

Web server 20 and database server 30 may comprise general purpose computers or other computing platforms having processor and memory components. Alternatively, web server 20 and database server 30 may be any combination of hardware and software that includes components suitable for processing and storing data encoded instructions. Web server 20 includes a candidate web engine 22, recruiter web engine 24, and employer web engine 26. Web engines 22, 24 and 26 are software modules residing on web server 20 that maintain the necessary processing routines, user interfaces, and templates to allow users accessing web server 20 from one of clients 40, 50 and 60 to utilize system 10 to perform respective recruiting functions further illustrated with reference to FIGS. 5 through 17.

Database server 30 includes a candidate mapping engine 32, a job indexing engine 34, a filter engine 36, and a candidate matching engine 38. Candidate mapping engine 32 and job indexing engine 34 are software modules or other suitable components residing on database server 30 that perform processing, indexing, and storage of job candidate qualification data and job posting information, respectively. Filter engine 36 is a further software module or other suitable component that performs a gatekeeping or filtering function with respect to either candidate profiles or job postings that are entered by candidates or employers, respectively. Candidate matching engine 38 performs processing and matching of candidate profiles with suitable job postings. These components and database server 30 are described in greater detail in the description accompanying FIG. 3.

Web server 20 and database server 30 may be separate servers communicating across a particular communication link 35 as described, or alternatively may describe only separate functionality such that web server 20 and database server 30 may reside at a single, common server. For example, web server 20 and database server 30 may reside on a single physical server, with the modules or components that make up database server 30 being insulated and secured from public network access across a particular communication link 35 by a fire wall or similarly suitable security system. Thus, components on database server 30 can be secured while allowing components on web server 20 to be freely or selectively accessed over communication links 35 via a public communications network.

Clients 40, 50 and 60 may each be a client, workstation, terminal, personal computer, or other computing device having input and output modules that enable a user to enter and view data. Clients 40, 50 and 60 may include a web browser, other user interfaces, memory, processing components, and other peripherals common to such computing devices.

Communication links 35 may be dedicated or switched links of a private or public network. For example, each of communication links 35 may be implemented using a fiber, cable, or twisted-pair connection over a public-switched telephone network, a satellite, radio, microwave, or other wireless link, or other suitable communications link between the components of system 10.

Memory included within servers 20 and 30, or within clients 40, 50 and 60, may comprise one or more files, data structures, lists, or other arrangements of information stored in one or more components of random access memory (RAM), read-only memory (ROM), magnetic computer disks, CD-ROM, other magnetic or optical storage media, or any other volatile or non-volatile memory. Likewise, it should be understood that any databases, engines or other modules of system 10 may be internal or external to the illustrated components of system 10, depending on the particular implementation. Also, such modules may be separate or integral to other databases. Any appropriate referencing, indexing, or addressing information can be used to relate back to an address or location of a database, file or object within system 10.

The components of system 10 may be part of a local area network (LAN), a wide-area network (WAN), or other suitable network or interconnection of computing devices. In a particular embodiment, components in system 10 communicate over the Internet using the World Wide Web (WWW), File-Transfer Protocol (FTP), Telnet, Usenet, Gopher or Archie utilities, mobile objects, electronic mail, bulletin boards, or other suitable communication techniques. For example, clients 40, 50 and 60 may maintain and execute a browser or other suitable parsing program for accessing and communicating information addressed by Uniform Resource Locators (URL) using one or more communication links 35.

The components of system 10 may be implemented in a programming environment that supports access or linking to various sources of information in system 10 using URL addresses. As such, the content of such modules and databases may be constructed using Hypertext Mark-Up Language (HTML), Standard Generalized Mark-Up Language (SGML), Virtual Reality Mark-Up Language (VRML), Javascript, or any other appropriate content development language. The modules of system 10 may also include program code, such as applets written in Java, or other appropriate self-executing code.

In operation of system 10, web server 20 receives candidate qualification data in the form of a candidate profile from a job candidate using candidate client 40. The candidate profile is entered into a candidate survey form 21 generated by candidate web engine 22. This process and candidate survey form 21 are further illustrated in FIGS. 5 and 14A–14B. The candidate qualification data may be communicated to database server 30 for processing, indexing and storage using candidate mapping engine 32. Web server 20 also receives job posting submissions from an employer via employer client 60 using employer web engine 24. Job posting submissions may also be communicated to database server 30 for processing indexing, and storage using employer indexing engine 34. Recruiter client 50 accesses web server 20 using recruiter web engine 26 in order to review submitted candidate qualification data and job postings. In one embodiment, filter engine 36 may also filter the communication of candidate profiles and job posting submissions to database server 30.

Referring to FIG. 2, servers 20 and 30 and clients 40, 50 and 60 may operate on one or more computers 80. Each computer 80 includes one or more input devices 82 such as a keypad, touch screen, mouse, or other pointer or device that can accept information. An output device 84, such as a monitor, for example, conveys information associated with the operation of servers 20 or 30, or clients 40, 50, or 60, including digital data, visual information, and/or audio information. A processor 86 and its associated memory 88 execute instructions and manipulate information in accordance with the operation of system 10. For example, processor 86 may execute coded instructions that are stored in memory 88 on data that is also stored on memory 88. Computer 80 may also include fixed or movable storage media such as a magnetic computer disk, CD-ROM, or other suitable media to either receive output from, or provide input to, servers 20 and 30 and clients 40, 50 and 60.

FIG. 3 illustrates a more detailed embodiment of database server 30. In the illustrated embodiment, database server 30 includes candidate mapping engine 32, job indexing engine 34, filter engine 36, and candidate matching engine 38.

In the illustrated embodiment, candidate mapping engine 32 includes a candidate record database 102, a candidate map 104, and a candidate review template 106. Candidate record database 102 comprises a plurality of candidate records 108 that are generated from candidate profiles received from web server 20. In particular, candidate qualification data entered by a potential candidate using web server 20 is organized and stored in a candidate record 108. Candidate map 104 may be either a single or multi-dimensional index having one or more tiers or levels of candidate qualifications under which candidate records 108 are listed by a plurality of candidate identifiers 110.

Candidate review template 106 is a template including fields used to display candidate records 108 for review that are listed in candidate map 104. Different versions of candidate review template 106 may be displayed depending on the identity of the user accessing candidate records 108. For example, a recruiter may review candidate records 108 using a version of candidate review template 106 that includes additional fields associated with evaluation or feedback information of a candidate, for example, for entry and later review of such information. An employer or candidate version of candidate review template 106 may include less fields or fields devoted to other information such as whether the candidate has received feedback on the displayed candidate record 108 or whether the employer wishes to indicate interest in the displayed candidate record 108. In one embodiment, recruiting events associated with a particular candidate record such as an employer indicating interest, a suitable job being found, an interview being scheduled, an offer being given, or other suitable event may be stored in a general or more particular recruiting event field.

Candidate identifiers 110 are unique identifiers, such as alphanumeric strings, for example, that are generated by candidate mapping engine 32 upon parsing a particular candidate record 108 to determine individual candidate qualifications for the purpose of indexing a particular candidate in candidate map 104. For example, parsing a particular candidate record 108 may result in the determination of eighteen candidate qualifications related to geography, technical qualifications, educational background, desired job features, and/or professed expertise or competency. As a result of such parsing, eighteen candidate identifiers 110 will be generated by candidate mapping engine 32 for indexing and listing in map categories of candidate map 104 corresponding to the eighteen candidate qualifications 110. Candidate identifiers 110 may be listed in candidate map 104 using hypertext links or other selectable inputs that operate to display an associated candidate review template 106 that includes qualification data for the candidate record 108 corresponding to the selected candidate identifier. Thus, all candidate records 108 from candidate database 102 will be listed in and accessible from candidate map 104.

In the illustrated embodiment, job indexing engine 34 includes a job posting database 122, an employer database 123, and a job posting review template 126. Job posting database 122 is composed of a plurality of job posting records 124 that are generated from job posting submissions received from web server 20. In particular, a job posting submission generated by an employer using web server 20 is organized and stored in a particular job posting record 124. Job posting records 124 may be organized within job posting database 122 according to the identity of the employer submitting the corresponding job posting submission. Alternatively, a job posting map may be utilized to organize and display job postings. Employer database 123 includes general information about employers who may have job postings included within job posting database 122.

Job posting review template 126 is a template including fields used to display job criteria for a particular job posting record 124 that is accessed for review. Again, as with candidate review templates 106, different versions of job posting review templates 126 may exist and be displayed depending on the identity of the user accessing a job posting record 124 for review. When a recruiter accesses a job posting record 124, recruiting event fields or feedback fields may, for example, be presented which show candidates that have been assigned by recruiters to the displayed job posting record 124 as matching job criteria of the displayed job posting record 124. Additional fields reviewable by an employer may include feedback fields for indicating candidates that have selected an application input or otherwise expressed interest in the displayed job posting record 124. Additionally, fields may be presented to a recruiter which show additional information known about an employer including recruiting preferences, general candidate qualifications for that employer, special contact methods, or other information to assist a recruiter in meeting the recruiting requirements of the employer submitting the displayed job posting record 124. The recruiter version of job posting review template 126 may also contain a link to a more general employer record having more specific information about the employer generally.

Filter engine 36 is a software module or other suitable combination of software and/or hardware operable to screen candidate profiles entered via a candidate survey form before storing such candidate profiles in candidate records 108 within candidate record database 102. In one embodiment, filter engine 36 includes automated benchmarks by which candidate qualification data in a profile is evaluated before being approved. For example, a first, most basic level of automated benchmarks may simply confirm that valid candidate qualification data has been entered in each field of candidate survey form 21. A more complex evaluation may include ascertaining whether or not a predefined level of experience or competency is demonstrated by the candidate qualification data. For example, filter engine 36 may determine if a predefined level of education has been achieved by a candidate.

Alternatively, a more complex evaluation may take place where candidate qualification data in particular fields of a candidate survey form are evaluated in part based on candidate qualification data in other fields of the candidate survey form. For example, if candidate qualification data indicates a desired employment position in the field of software project management, filter engine 36 may determine if the candidate has a predetermined number of years experience in software development and/or project management.

In one embodiment, filter engine 36 is a software module that assists a recruiter or other user in reviewing candidate profiles prior to the candidate qualification data being transferred from web server 20 to database server 30. In such an embodiment, a recruiter is presented with the candidate profile. If the recruiter approves the candidate profile for incorporation into one of candidate records 108, the recruiter may select a candidate approval indicator presented by filter engine 36. The selection initiates the transfer of the candidate profile to database server 30 for storage as one of candidate records 108 in candidate record database 102. Thus, utilizing filter engine 36 allows candidate qualification data in a candidate profile that has previously been entered by a potential candidate to be automatically transferred to database server 30 for storage and processing without rekeying or scanning of the candidate qualification data. Although filter engine 36 is described as residing on database server 30, filter engine 36 may alternatively reside on web server 20 or in another suitable location to allow a recruiter to review candidate qualification data without accessing database server 30.

Candidate matching engine 38 is a software module or other suitable combination of software and/or hardware components operable to match candidate records 108 to job posting records 124. Candidate matching engine 38 may include matching algorithms and/or listed hierarchies of matching criteria wherein different weights can be assigned to different criteria depending on empirical data, employer, and/or recruiter preference. For example, specific matching criteria may include required job criteria and preferred job criteria that is designated by an employer. Job criteria may alternatively be ranked by an employer or recruiter. The matching process is described in greater detail with reference to the flow chart of FIG. 15.

FIG. 4 illustrates one embodiment of candidate map 104 of FIG. 3. Candidate map 104 includes main indexing categories 402 such as the illustrated examples of geographic location, software, and project management. However, main indexing categories 402 may refer to any classification or specific candidate qualification data including, for example, technical qualifications, skills, experiences, educational background, desired position, certifications, or virtually any other piece of candidate qualification data entered by candidates in a candidate survey form. Sub-categories 404 are listed under main indexing categories 402. Subcategories are more specific ways of classifying candidates within a particular main indexing category. Each sub-category 404 may in turn have further sub-categories 406. Main indexing categories and/or sub-categories may have corresponding associated candidate identifiers 408. Associated candidate identifiers correspond to candidate records 108 that include candidate qualification data matching a category or sub-category. For example, a particular sub-category 404 under geographic location may be indicated as California and may include further sub-categories 406 such as San Diego, San Francisco, Los Angeles, and Sacramento. Candidate identifiers 408 are listed under Sacramento. The listed candidate identifiers 408 correspond to candidate records 108 indicating a geographic preference of Sacramento or a listed address of a candidate indicated as Sacramento. As illustrated, general technical categories such as software may be indexed and then further defined by subcategories 404 of specific software languages or concepts. Further sub-categories 406 may include years of experience with a particular software language or concept and may also indicate managerial or supervisory experience associated therewith. A more positional-based indexing scheme may also be utilized wherein a general position type such as project management may be further defined by technical expertise.

Figure 7:
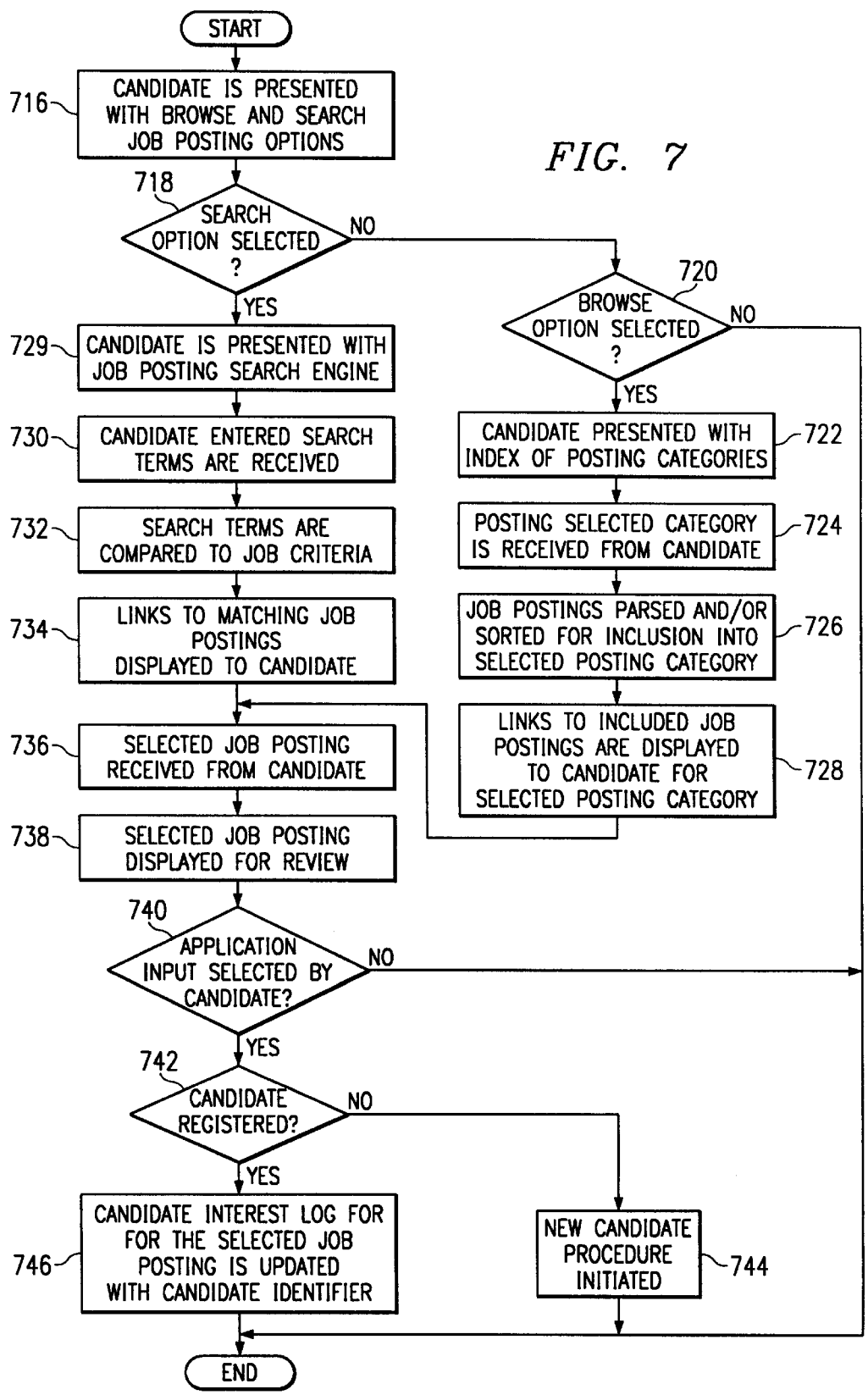
FIG. 7 illustrates a flowchart of a method for presenting a candidate with a procedure to browse and/or search the current job postings of the system.
Figure 8:
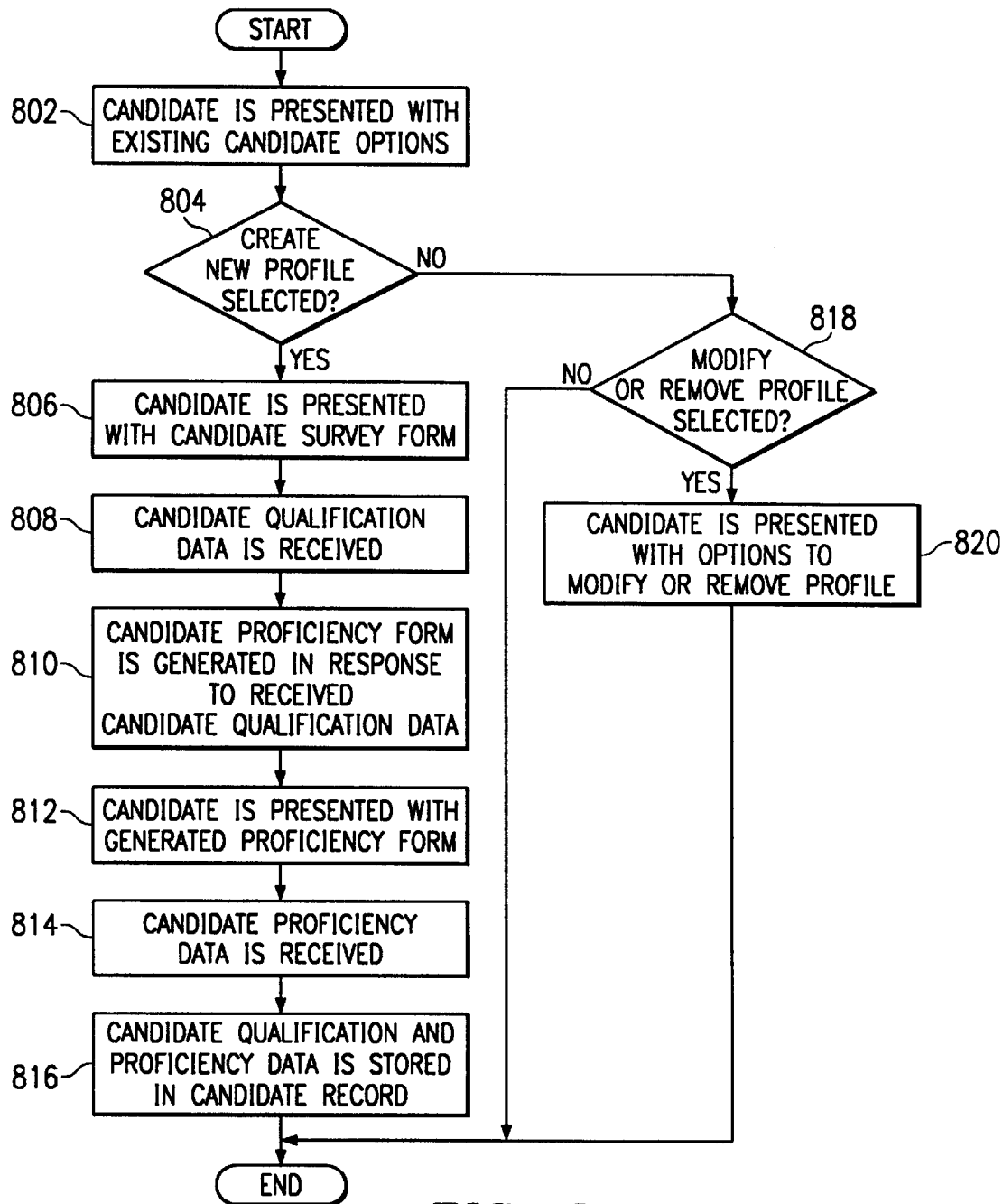
FIG. 8 illustrates a flowchart of a method for presenting a candidate with a process to enable existing candidates to modify or remove their existing profile, or to create a new profile entirely.
Figure 9:
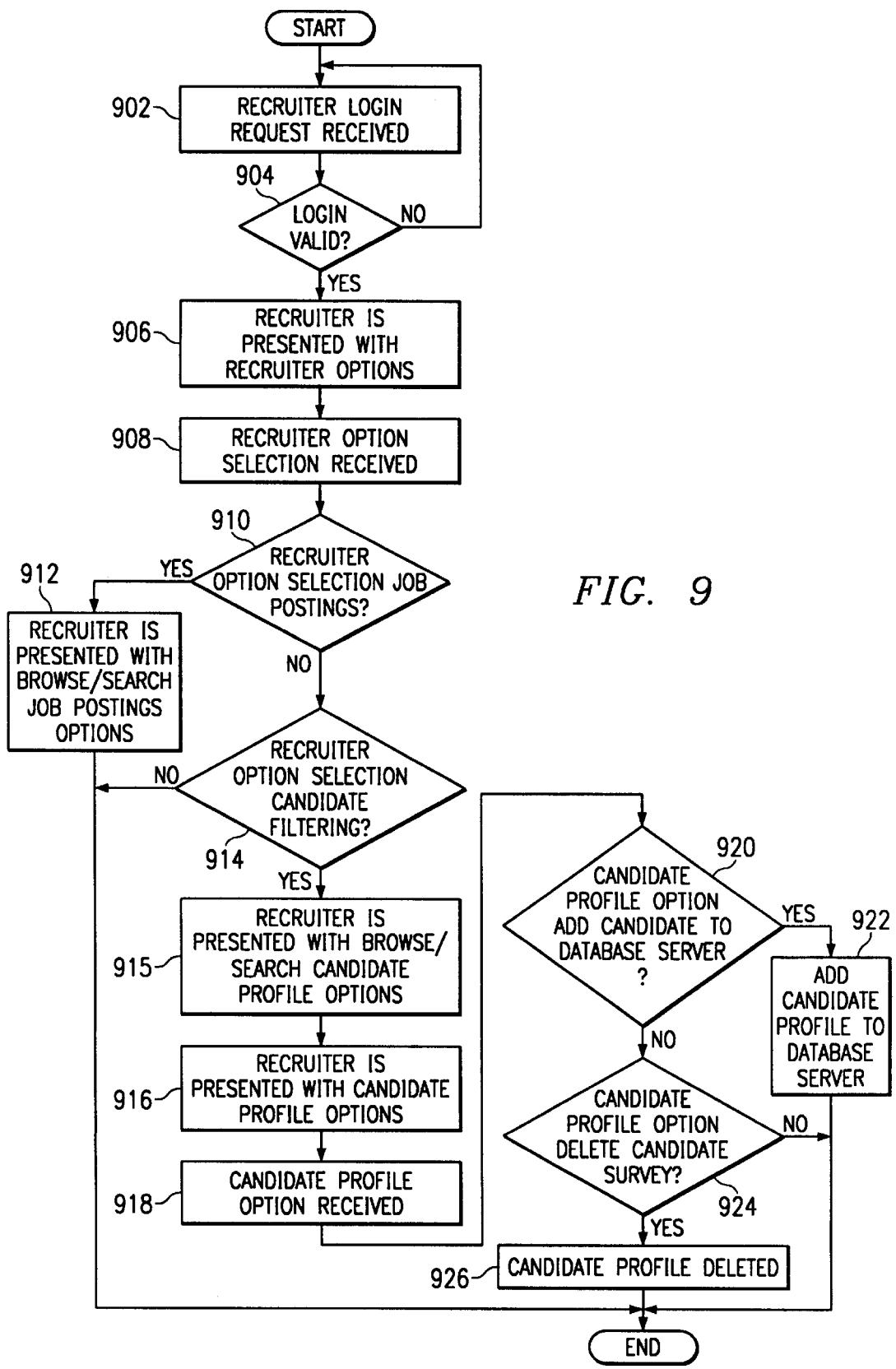
FIG. 9 illustrates a flowchart of a method of presenting a recruiter with a process for reviewing and evaluating candidates and job postings.

FIGS. 5 through 13 illustrate flowcharts describing the processes used by candidates, recruiters and employers to access system 10 in order to perform recruiting and processing functions. FIGS. 5 through 8 describe options that are available to a candidate user. FIG. 9 describes options available to a recruiter user. FIGS. 10 through 13 describe options available to an employer user.

FIG. 5 illustrates a flow chart of a method for displaying recruiting options to a candidate who is accessing system 10. In step 502, candidate options are presented to a candidate via a user interface on candidate client 40. For example, the candidate may be presented with an option for existing candidates to log in, an option to review current job postings, and an option for new candidates. The candidate options each act to allow the candidate access to additional functionality within system 10. In step 504, an input corresponding to one of the candidate options is received by candidate web engine 22 in response to a selection of the candidate. In step 506, the candidate option input received by candidate web engine 22 in step 504 is compared to candidate option identifiers to determine if the new candidate option was selected by the candidate. If the new candidate option was selected, the candidate is then presented with existing candidate options in step 508 using the new candidate procedure described in FIG. 6. In step 510, if the new candidate option was not selected, candidate web engine 22 determines if the review job postings option was selected by the candidate. In step 512, if the review job postings option was selected, the candidate is presented with further options to review job postings using the review job postings procedure described in FIG. 7. If the review job postings option was not selected, candidate web engine 22 determines in step 514 if the existing candidate login option was selected. If the existing candidate login option was selected, the candidate is presented with the options for existing candidates using the procedure described in FIG. 8.

Figure 6:
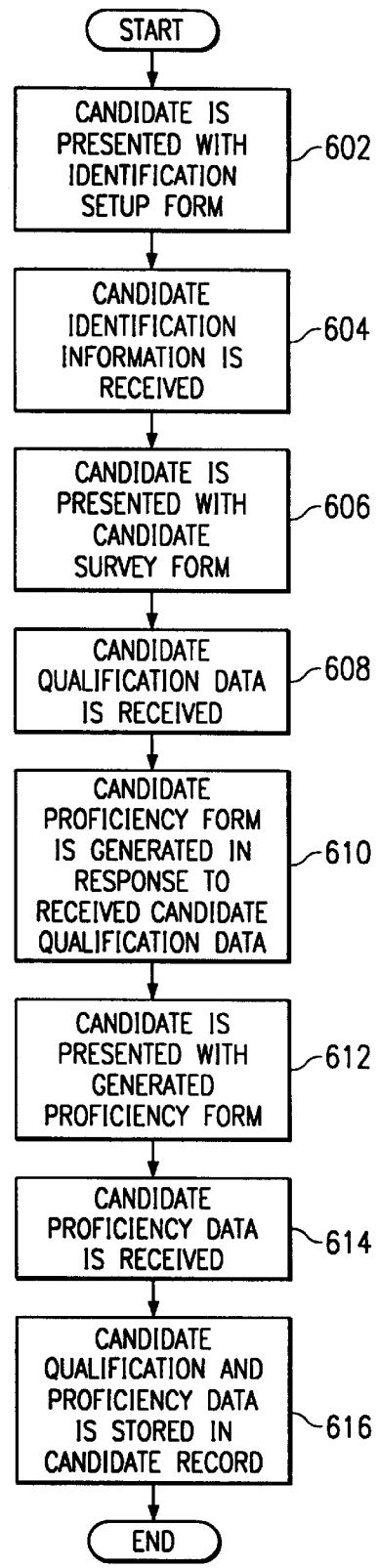
FIG. 6 illustrates a flowchart of a method for presenting a new candidate with a procedure to create a candidate profile.

FIG. 6 illustrates a flowchart of a method for presenting a new candidate with a procedure to create a candidate profile. In step 602, the candidate is presented with an identification setup form. In step 604, candidate qualification data entered by the candidate via the identification setup form is received by candidate web engine 22 and a candidate identifier unique to the candidate is generated.

In step 606, the candidate is presented with a candidate survey form for entering candidate qualification data. Candidate qualification data may include, for example: contact information; background information; educational qualifications; employment history; candidate job preferences including desired geography, working environment, or benefits; special training; expertise with particular processes, systems or software; or other relevant skills of the candidate. A candidate may enter textual content in fields or dialog boxes that are presented to the candidate in order to receive freeform data generated and typed in by the candidate. Additionally, the candidate survey form may include options presented to the candidate that have been selectable by the candidate, scroll bars that are moveable to indicate a particular piece of data, or other selectable or manipulatable icons, buttons, links, highlightable data items, or any other piece of selectable data that has been pre-generated by system 10 and presented to the candidate via the candidate survey form. One embodiment of a candidate survey form is illustrated in FIG. 14.

In step 608, the candidate qualification data is received from the candidate as entered or selected in the candidate survey form. For example, after a candidate has completely filled out a candidate survey form with both freeform data and data selected by the candidate from pregenerated data items, a candidate may select a submit survey form button or other indicator to transmit all entered and selected data to candidate web engine 22.

In step 610, a candidate proficiency form is generated in response to particular items of the received candidate qualification data. For example, portions of the candidate qualification data may include a list of selectable skills, indicated qualifications, or identified past experiences. A candidate proficiency form would therefore be generated in step 610 that included certain of the candidate skills, qualifications, and experiences. The form includes one or more fields, corresponding to the skills, qualifications, or experiences, such that the candidate can indicate a professed proficiency level or rating for each item of candidate qualification data listed on the candidate proficiency form. An example of a candidate proficiency form is described in FIG. 15.

In step 612, a candidate is then presented with the generated candidate proficiency form. In step 614, after a candidate has indicated proficiency levels for each piece of candidate qualification data listed on the candidate proficiency form, candidate web engine 22 receives the completed candidate proficiency form after submission by the candidate. In step 616, candidate proficiency data is included as candidate qualification data and candidate qualification data for the candidate is indexed and stored in one of candidate records 108 for later review by the candidate, recruiters, or potential employers. The candidate record 108 corresponds to the candidate identifier for that particular candidate. In one embodiment, candidate qualification data may be indexed and stored in one of candidate records 108 only after recruiter assisted or automated filtering via filter engine 36. In any case, approved candidate qualification data is transferred in a format as to allow immediate parsing and processing of included data by system 10.

FIG. 7 illustrates a flowchart of a method for presenting a candidate with a procedure to browse and/or search the current job postings of system 10. In step 716, the candidate is presented with options to either browse or search job postings. In step 718, candidate web engine 22 determines if the search job postings option has been selected by the candidate. If the search job posting option was not selected, candidate web engine 22 then determines in step 720 if the browse job posting option was selected by the candidate.

Figure 17:
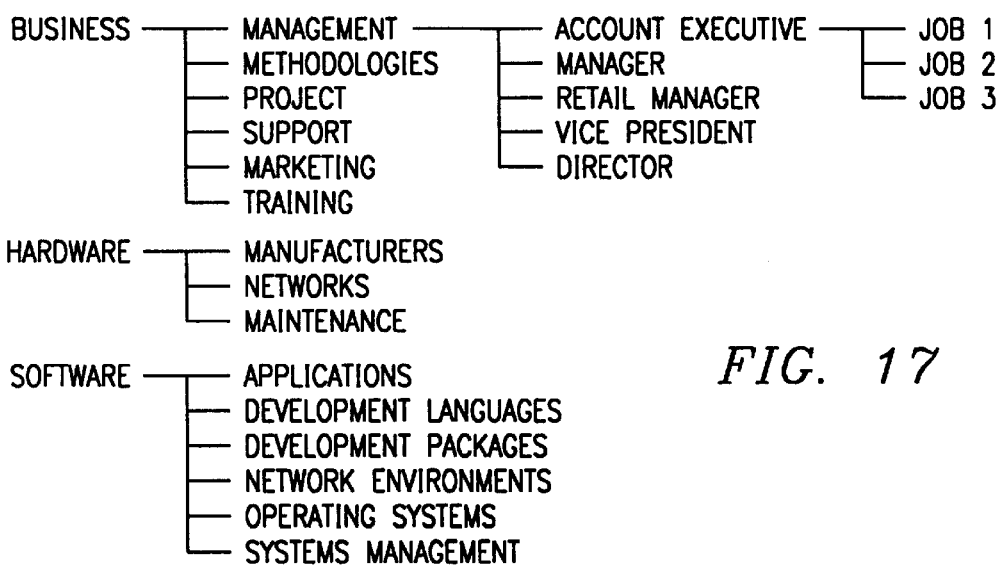
FIG. 17 illustrates an embodiment of a hierarchical structure that may be used within an index of job postings.

If the browse job posting option was selected by a candidate, the candidate is presented with an index of job postings in step 722. It should be noted that several levels or hierarchies of job postings may exist. For example, the index may be organized into fields, with each selected field displaying an index of job types within a particular field. Within each job type indexed in a particular field may be yet another sub-index containing jobs for specific skills or skill levels. An example of an index of job postings from categories to actual job postings is illustrated in FIG. 17. The index of job postings may be organized using a hierarchy of links, for example, wherein a candidate can navigate by selecting a job field or category in order to eventually select a job posting identifier that is linked to an actual job posting as described below.

In step 724, a job posting category selected by the candidate from the index of job postings is received from the candidate. In step 726, job posting records 124 included in job posting database 122 are parsed and/or sorted for inclusion in the selected job posting category received from the candidate in step 724. Such parsing and sorting may be done in real time upon receiving a selected posting category from a candidate such that job posting records 124 presented to the candidate in the selected job posting category will be current as of the time of selection. Alternatively, job posting records 124 may be indexed when initially submitted by an employer, or indexed at regular intervals by system 10. In step 728, job posting identifiers, linked to corresponding job posting records 124 that were included in the job posting category received in step 724, are displayed to the candidate.

If the search job posting option was determined to have been selected by the candidate in step 718, the candidate is presented with a job posting search engine in step 729. In step 730, candidate entered search terms and conditions using the job posting search engine are received by candidate web engine 22. In step 732, those search terms and/or conditions are compared to job criteria that are generated in response to parsing job posting records 124. For example, job criteria specifying skills, locations, and positions may be compared to search terms entered by a candidate. In step 734, job posting identifiers or other links to job posting records 124 associated with job criteria that match candidate entered search terms are displayed to the candidate.

In step 736, regardless of whether browse or search options were utilized by a candidate, a specific job posting selection is received from the candidate and the job posting record 124 is presented to the candidate for review in job posting review template 126 in step 738. Also presented with the job posting record 124, a particular field, link, or button may be displayed as an application indicator whereby a candidate can communicate interest in the particular job. In step 740, candidate web engine 22 determines if the application indicator was selected by the candidate. If the application indicator was received, candidate web engine 22 will determine if the candidate is a registered candidate in step 742. If the candidate is a registered candidate, a candidate interest log or other feedback field associated with the particular job posting record 124 is updated with the candidate identifier associated with the candidate profile for that candidate. For example, a candidate interest log or other feedback field may be updated within the corresponding job posting record 124 and may include the particular candidate's name and a link to the associated candidate record 108. This may be accomplished using, for example, one of candidate identifiers 110. If an application indicator has been received from the candidate in 740, but the candidate is not determined to be registered in step 742, the candidate is presented with the new candidate procedure described in FIG. 6.

FIG. 8 illustrates a flowchart of a method for presenting a candidate with a process to enable existing candidates to modify or remove their existing profile, or to create a new profile entirely. In step 802, the candidate is presented with existing candidate options including an option to create a new candidate profile and an option to modify or remove an existing candidate profile. In step 804, candidate web engine 22 determines if the create new profile option was selected by the candidate. If the create new candidate profile option was selected, the candidate is presented with a new candidate survey form in step 806. Steps 806 through 816 are identical to steps 606 through 616 that are described with reference to FIG. 6. Once completed, a new candidate record 108 may replace the existing candidate record 108 of the candidate. If the create new profile option was not selected by the candidate in step 804, candidate web engine 22 determines in step 818 if the modify or remove candidate profile option was selected. If modify or remove candidate profile was selected by the candidate, the candidate is presented in step 820 with a series of options to modify or remove portions of or the entirety of the existing candidate profile for that particular candidate. Such modify and remove options may be preceded by the candidate presenting a candidate identifier and candidate security code so that the proper existing candidate profile may be retrieved for presentation to a properly verified candidate. The modification and removal options may further include the presentation to the candidate of particular portions of that candidate's existing candidate profile for modification or deletion via user interface. Of course, an option may also be presented to enable the deletion of the candidate's entire survey form.

FIG. 9 illustrates a method of presenting a recruiter with a process for reviewing and evaluating candidate profiles and job postings. In step 902, a recruiter login request is received from recruiter client 50. In step 904, recruiter web engine 24 determines if the received recruiter login request corresponds to a valid recruiter identification. If the login request does not appear to be valid, recruiter client 50 is represented with a recruiter login query requesting the recruiter's identification. For example, a recruiter may enter a recruiter identification and a corresponding security code which, if not corresponding to a valid recruiter log in/security pair, is then rejected and the recruiter queried to reenter an identification and security code. If the login request is determined to be valid in step 904, the recruiter is presented with a list of recruiter options in step 906. For example, recruiter options for review of job postings and for candidate filtering may be presented.

In step 908, a recruiter option that has been selected by the recruiter is received by recruiter web engine 24. In step 910, recruiter web engine 24 determines if the review job postings option was selected. If the review job postings option was selected, the recruiter is presented with the browse and/or search job postings options in step 912. Job postings are then browsable, searchable, and reviewable by the recruiter using a user interface and displayed options. In step 914, if the recruiter option selection was not determined to be job postings in step 910, recruiter web engine 24 determines if candidate filtering was selected. If candidate filtering was selected, the recruiter is presented with browse and/or search candidate profile options in step 915. Such browse and/or search candidate profile options allow a recruiter to review completed candidate profiles based on search terms or browsing within particular categories of candidate profiles. For example, a recruiter may either browse or search candidate profiles based on the date the candidate profiles were submitted by a candidate, particular candidate qualification data that populates the candidate profiles, or any other item of data capable of being extracted from a candidate profiles.

Once the recruiter has selected a candidate profile as a result of browsing and searching the candidate profiles in step 915, the recruiter is presented with candidate profile options associated with the selected candidate profile in step 916. For example, candidate profile options may include an option to add the candidate profile to database server 30 or to delete the candidate profile. In step 918, the candidate profile option is received from the recruiter. In step 920, recruiter web engine 24 determines if the candidate profile option selected is to add the candidate to database server 30. If the candidate profile option is to add the candidate to database server 30, the candidate profile is added to database server 30 in step 922. If the candidate profile option is not to add the candidate to database server 30, recruiter web engine 24 determines if the candidate profile option is to delete the candidate profile. If the candidate profile option is to delete the candidate profile in step 924, the candidate profile is deleted by system 10 in step 926.

Figure 10:
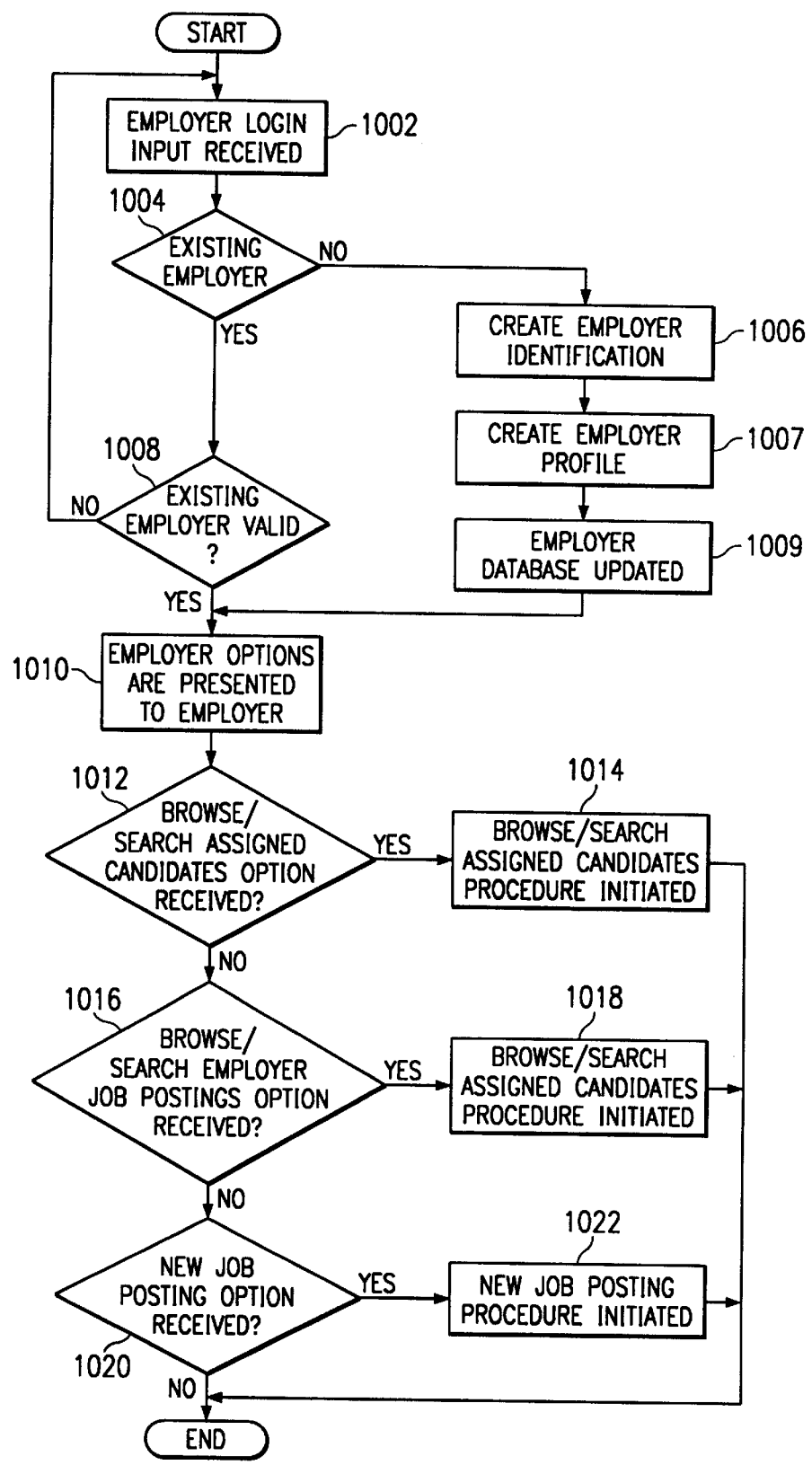
FIG. 10 illustrates a flowchart of a method of processing job postings that are submitted by an employer.

FIG. 10 illustrates a method of processing job postings that are submitted by an employer. In particular, a process is presented whereby employers can enter new job postings, browse or search previously entered job postings, or browse or search candidate records corresponding to candidates that have been assigned by a recruiter to any of the employer's job postings.

In step 1002, an employer login input is received by employer web engine 26. In step 1004, employer web engine 26 determines if the employer login input is an existing employer login or an indicator by the employer that they are a new employer that desires registration with system 10. If the employer is not an existing employer, an employer identification is created in step 1006. An employer may also be prompted to create an employer profile in step 1007 for later access and review by recruiters and/or potential candidates. The employer profile may include, for example, address, facilities, number of employees, annual revenues, descriptions of products or services, and/or a description of benefits, company goals, or line of business. Employers may choose to have their employer profile remain unavailable to potential clients, or may allow such access only to potential candidates they have pre-approved or in which they have expressed an interest. Employer database 123 of FIG. 3 is then updated with both employer identification and the employer profile in step 1009. After such employer identification has been created, employer options are presented to the employer as described below in step 1010.

If the employer is an existing employer, employer web engine 26 determines if the employer login is valid in step 1008. If the existing employer login is invalid, the employer is again queried to reenter their employer login. The employer login input may include an employer identifier and an employer security code. Thus, in step 1008, employer web engine 26 may verify that the entered employer identifier corresponds to the entered employer security code before allowing the employer to access employer options in step 1010.

In step 1010, employers are presented with employer options. For example, such employer options may include browsing and/or searching assigned candidates, browsing and/or searching existing employer job postings, or entering a new job posting. In step 1012, employer web engine 26 determines if the browse and/or search assigned candidates option was received from the employer. If the browse/search assigned candidates option was received, the employer is presented with a series of browse and search options in step 1014. The procedure associated with such browse and search options is further described in FIG. 11. If the browse/search assigned candidate option was not determined to have been received in step 1012, employer web engine 26 determines if the browse/search employer job postings option was received in step 1016. If the browse/search employer job postings option was received in step 1016, the employer is presented with a series of browse and search options as further described in FIG. 12. If the browse/search employer job postings option was not determined to be received in step 1016, system 10 determines if a new job posting option was received in step 1020. If a new job posting option was received in step 1020, a job posting process is then presented to the employer in step 1022. The job posting process is further described in FIG. 13.

Figure 11:
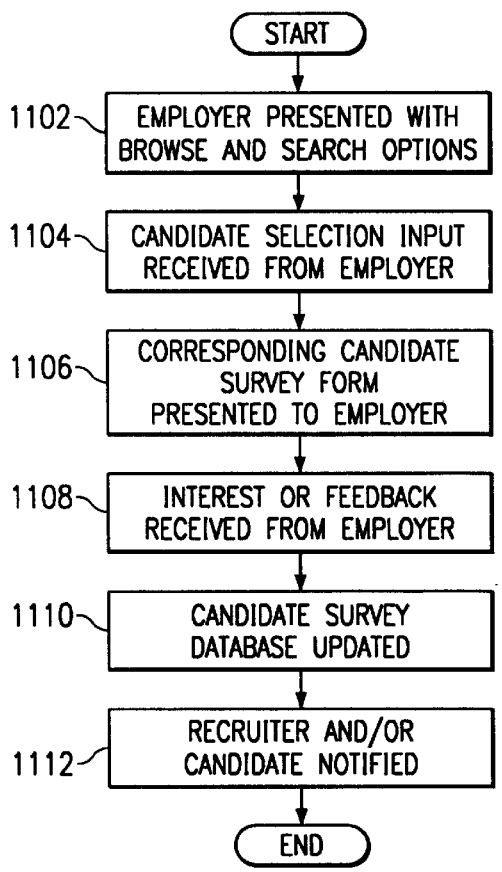
FIG. 11 illustrates a flowchart of a process by which an employer is presented with browse and search options in order to review candidates that have been assigned to the employer's job postings.

FIG. 11 illustrates the process by which an employer is presented with browse and search options in order to review candidates that have been assigned to the employer's job postings. In step 1102, the employer is presented with browse and/or search options by employer web engine 26 in order to allow the employer to navigate to a particular job posting and/or candidate identifier associated with a particular job posting. In step 1104, a candidate selection input is received from the employer. For example, the candidate selection input may consist of the employer selecting a link corresponding to a particular candidate that is listed under a job posting of the employer that is being viewed. In step 1106, a candidate profile corresponding to the candidate selection input received from the employer is presented to the employer for review in a candidate review form. In step 1108, an employer may indicate interest in the candidate profile or present feedback associated with the candidate profile and transmit such interest or feedback for receipt by employer web engine 26. In step 1110, the candidate profile is updated with the indicated interest or feedback received from the employer. In step 1112, a recruiter and/or the candidate associated with the interest or feedback is notified that the interest or feedback has been indicated by the employer. A variety of notification, processing, and/or further candidate recruiting functions can be initiated in response to receiving notification that interest or feedback in a particular candidate has been received from an employer. For example, electronic mail can be sent to a candidate. Additionally, an interview action list may be updated to indicate to a recruiter that an employer desires an interview with a candidate. An additional survey form can also be generated and communicated to a candidate in response to specific feedback or additional information requested from the employer. Other suitable procedures may be initiated and still be within the scope of the present invention.

Figure 12:
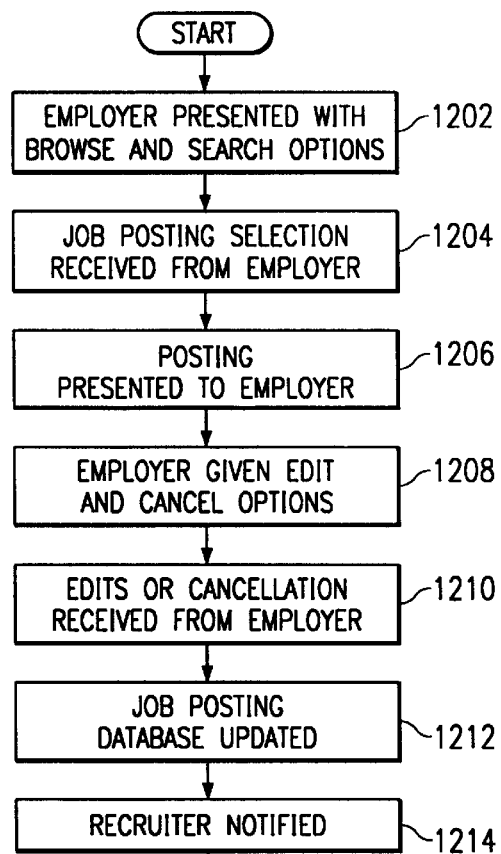
FIG. 12 illustrates a flowchart of a process by which employers can browse or search preexisting employer job postings for review.

FIG. 12 illustrates a process by which employers can browse and/or search preexisting employer job postings for review. In step 1202, the employer is presented with browse and/or search options wherein a particular job posting may be selected by an employer. In step 1204, the job posting selection is received from the employer. In step 1206, the job posting corresponding to the job posting selection is presented to the employer for review. In step a 1208, the employer is given edit and/or cancel options associated with the particular job posting. In step 1210, edits or a cancellation are received from the employer for the job posting. In step 1212, job posting database 122 is updated to reflect either edits to or a cancellation of the preexisting job posting. In step 1214, a recruiter is notified that the edits or cancellation have taken place.

Figure 13:
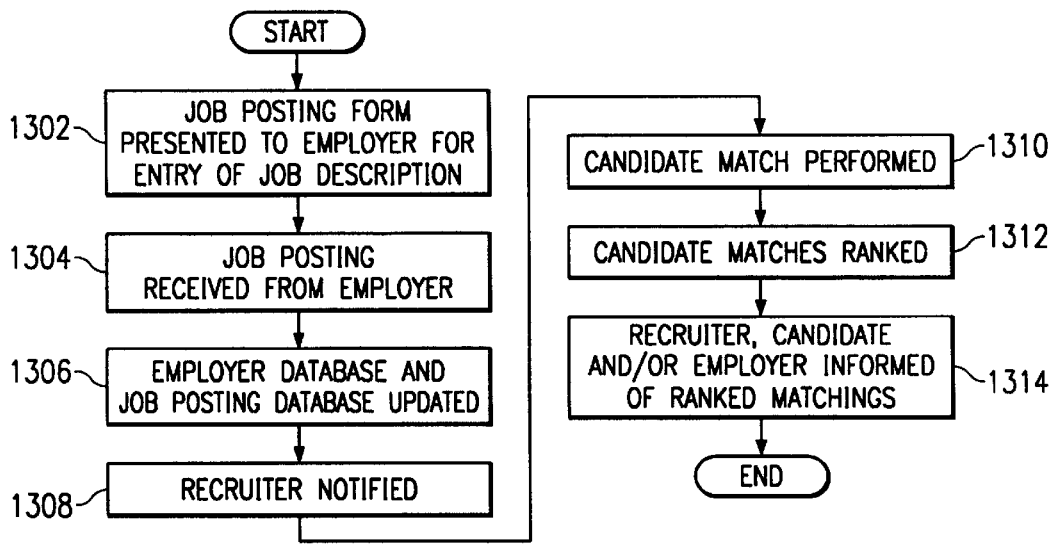
FIG. 13 illustrates a flowchart of a process by which new job postings can be created and registered by an employer.

FIG. 13 illustrates a flowchart of a process by which new job postings can be created and registered by an employer. In step 1302, a job posting form is presented to the employer for entry of job description. An example of a job posting form is presented and described in FIG. 18. The job posting form includes desired candidate qualifications in the form of job criteria. Certain job criteria may be designated as required, while other criteria may only be designated as preferred or desirable. Any other suitable weighting scheme or other means of indicating the relative importance of particular job criteria may also be used. In step 1304, the completed job posting is received from the employer. In step 1306, the employer database and job posting database are updated to reflect the addition of the new job posting. In step 1308, a recruiter is notified that the new job posting has been entered by the employer. In step 1310, a candidate matching process is performed, by which particular job criteria for a particular job posting are matched to candidate qualification data of candidate records 108. One embodiment of such a process is further described in reference to FIG. 16.

In step 1312, candidate profiles that match job criteria listed in the new job posting may then be ranked according to a qualitative scale of how well such candidate survey forms match the particular job posting. For example, candidate profile forms may be ranked based on the number of candidate qualification data items that match the job criteria of the job posting. Certain job criteria may be weighted heavier or lighter in view of assigned importance to a particular employer or a particular job posting. As described, employers may have indicated certain job criteria that are mandatory or required for a particular job posting and other criteria that are just preferred or suggested. In such a case, only those candidates that fulfill the required job criteria will be included in the candidate ranking and the included candidate survey will be ranked relative to each other based on how each candidate survey matches the suggested or desired job criteria. Thus, it can easily be seen that a highly complex matching and ranking system may be employed that compares, weights and ranks candidate qualifications based on, for example, competency level, particular identified skills, a candidate's desired geography, or a candidate's educational level. Any job criteria may be weighted for evaluation during the ranking process as a result of employer indications, empirical knowledge, or a recruiter's preferences.

In one embodiment, matching or ranking algorithms may be utilized which take into account observed recruiting factors such as, for example, the likelihood that a candidate may relocate, or whether or not candidates with experience in a particular skill, position or technology generally do well in jobs associated with other skills, positions or technologies. In such an embodiment, candidates who have worked at particular companies may be further classified based on characteristics usually associated with employees of that company. Algorithms may also further take into account frequency of change in employment for a particular candidate, the availability of references for a candidate, and the educational background of a candidate. Each of these factors may be individually weighted for purposes of matching and/or ranking. The matching and ranking system described herein can save recruiters and human resource personnel significant time traditionally associated with the manual review of resumes.

In step 1314, the recruiter, candidate, and/or employer involved in the matching and ranking process may be informed of the ranked matchings depending on a particular notification scheme that has been selected automatically by employer web engine 26 or by a recruiter for a particular employer or job posting.

Thus, it can easily be seen that the automated procedures described in FIGS. 5 through 13 can significantly reduce the time and expense of tasks that were previously performed manually by recruiters and employers. Having candidates directly enter qualification data into a preformatted candidate survey form like the one described in FIGS. 14A through 15, whether or not submitted with an electronic resume, allows a recruiter or automated system to perform text searches and directly evaluate the suitability of a candidate for a particular job. Data in particular fields of a candidate survey form can be directly mapped into algorithms that evaluate candidate qualifications. Having employers similarly specify job criteria, and even assigning weights to certain of the job criteria, allows a recruiter or automated system to more accurately find and potentially rank all suitable candidates. Even individually, such procedures greatly improve efficiency in the recruiting of job candidates. When taken together, the procedures can significantly reduce time and expense associated with recruiting while obtaining a higher rate of satisfaction with candidates who are selected for a particular position.

FIG. 14A illustrates portions of one embodiment of a candidate survey form 1400 that is presented to a candidate registering with system 10 in order to obtain candidate qualification data from the candidate. Portions illustrated by FIG. 14A include a contact information section 1402 and a background information section 1404. Contact information section 1402 includes both selectable fields 1406 for the selection of predefined data and freeform fields 1408 for entry of data generated by the candidate. For example, both types of fields are presented for a candidate to enter his or her home address. Freeform fields 1408 are presented for street, city, and zip code fields to accept candidate generated data. Selectable field 1406 is presented wherein a candidate may select an abbreviation corresponding to the candidate's state of residence. Contact information section 1402 also includes fields for: entering preferred work locations; indicating the acceptability of relocating; designating evidence of a right to work in the United States; and indicating contact information, including phone numbers, fax numbers, pager numbers, and electronic mail addresses. Contact information section 1402 also includes a contact preference field selectable by the candidate to designate his or her preferred means of being contacted by system 10. Contact information section 1402 may also include a reference field whereby a candidate may indicate how the candidate became aware of system 10. This reference field can then be used by a company for purposes of marketing evaluation.

In background information section 1404, selectable and freeform fields are presented to a candidate so that a candidate may indicate education and work history. For example, education fields are provided whereby a candidate may indicate an education level, a major, a university and a date of graduation, if any. Likewise, fields are presented so that a candidate may describe his or her work history including: a list of companies, periods during which the candidates worked at those companies, the candidate's title or position at those companies, and the candidate's salary while working at the companies. The candidate may also grant permission for an employer to contact the companies if requested. Background information section 1404 may also include other employment information such as the candidate's current salary and the candidate's desired salary. A field is also provided whereby a candidate can indicate career goals, desired benefits and other comments directed towards the candidate's background or towards the candidate's desired employment opportunity.

FIG. 14B illustrates further portions of one embodiment of candidate survey form 1400 that is used by a candidate when registering with system 10. More particularly, FIG. 14B illustrates a skill inventory section 1410 and a resume section 1412. Skill inventory section 1410 includes both selectable fields and freeform fields. The selectable fields may include a list of business related skill keywords 1418, software related skill keywords 1420 and hardware related skill keywords 1422. A candidate may then select multiple keywords from lists 1418, 1420 and 1422 in order to indicate some proficiency in skills associated with the selected keywords. A candidate may also list additional skills not found in the selectable categories in freeform field 1424. Thus, skills associated with skill key words generated by system 10 and additional skills not associated with skill key words generated by recruiting system 10 may both be indicated by a candidate using candidate survey form 1400.

Resume section 1412 includes a field whereby a resume can be attached or entered by a candidate. For example, resume section 1412 may include a browse button 1414 for browsing a hard drive or other storage media in order to select or attach a resume in any number of recognizable word processing, imaging, or text-based formats. Likewise, a candidate may physically type text in the available resume field as an alternative to attaching a resume file. In one embodiment, a candidate has the option to fill out only a limited number of fields of candidate survey form 1400, while data requested by other fields of candidate survey form 1400 are automatically parsed or generated from the resume attached or typed in resume section 1412. Such an embodiment further automates the process of providing candidate qualification data and allows a candidate to complete candidate survey form 1400 in a shorter period of time. A submission button 1416 is provided on candidate survey form 1400 to allow a candidate who has completed candidate survey form 1400 to submit the form for registration.

Although candidate survey form 1400 has been presented in terms of freeform and selectable fields, other ways of allowing a candidate to introduce data in order to specify contact information, background information, and specific skill information may be employed within candidate survey form 1400. For example, any combination of selectable icons, links, indicators, bars, menus, or other input techniques can be used to allow entry of candidate qualification data using one or more forms or interfaces.

FIG. 15 illustrates one embodiment of a candidate proficiency form 1500 that is used by a candidate to specify a level of expertise for one or more candidate qualifications. For example, each skill indicated by a candidate in skill inventory section 1410 may be listed in candidate proficiency form 1500. A candidate can then enter or select, whether in selectable or freeform data fields, data to qualify candidate proficiency levels. For example, a candidate may designate the number of years of experience the candidate has associated with a particular skill, a subjective proficiency grade for a skill whether using numbers or words, a percentage mastery of a skill, advanced training completed, or other qualitative evaluation of their professed proficiency in that particular skill. For example, in one embodiment a candidate may indicate both years of experience in a particular skill and a proficiency level chosen from a select list of terms such as beginner, intermediate, full-understanding, or expert. Such terms are, of course, merely an example of subjective terms that may either be pre-generated by candidate recruiting system 10 or created by a candidate. In any case, candidate proficiency form 1500 allows a candidate to indicate a more detailed record of their skills and proficiency. Candidate proficiency form 1500 may also include a selection whereby a candidate may indicate whether the candidate wishes to be notified of a particular job posting that matches the candidate's skills and proficiency. Candidate proficiency form 1500 also includes submit skill details button 1510 for submitting a completed candidate proficiency form 1500.

Figure 16:
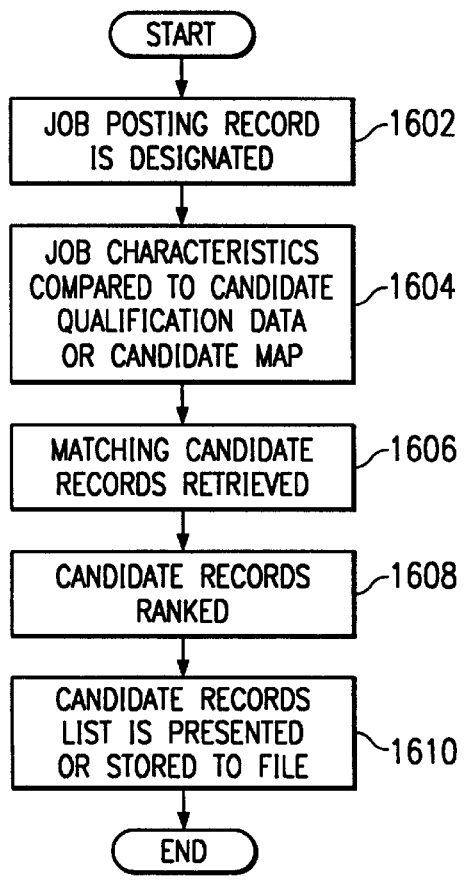
FIG. 16 illustrates one embodiment of a candidate matching process used by the system.

FIG. 16 illustrates one embodiment of a candidate matching process used by system 10. In step 1602, a particular job posting record 124 is designated for candidate matching. In step 1604, job criteria of the job posting are compared to candidate qualification data included within candidate records 1608. In an alternative embodiment, the job criteria are compared to categories of candidate map 1604. In either case, candidate records 1608 having candidate qualification data meeting the job criteria or listed in appropriate categories of candidate map 1604 are retrieved in step 1606. In step 1608, retrieved candidate records 1608 are ranked according to the weight assigned to each job criterion used to conduct the search. For example, candidate records 1608 not meeting job criteria defined as required may be ranked lowest or discarded when ranking is conducted. Candidate records 1608 which meet all required and preferred job criteria may be ranked highest. Candidate records 1608 which meet all required job criteria but only some preferred job criteria may be ranked lower, and may be further differentiated if some job criteria are more desired then others. In step 1610, the now ranked list of candidate records 1608 is presented to a user, or stored in a file or record, with each candidate record 1608 being listed by its associated candidate identifier 1610. For example, the list may be stored in the particular job posting record 124 itself, and viewed in a special field within job posting review template 126 whenever a recruiter or employer references the particular job posting record 124. Alternatively, the list may be used to generate an electronic mailing to each of the candidates corresponding to the selected candidate records 1608.

FIG. 17 illustrates an embodiment of the hierarchical structure that may be used within an index of job postings such as that described in FIG. 7. FIG. 17 merely illustrates the organization of such an index, and does not represent how the index would be displayed or accessed by a candidate or other user of system 10. For example, the hierarchy of categories illustrated in FIG. 17 may be accessed and interconnected in a series of links, icons, maps or other organization schemes that are presented to a candidate or other user. FIG. 17 illustrates the general employment fields of business, hardware, and software. Of course, any other combination of employment fields, whether more or less detailed, can be presented to a candidate in an index of employment fields. Within the employment field of business, management, methodologies, support, marketing and training sub-fields are illustrated. Within the employment field of hardware, sub-fields of manufacturers, networks and maintenance are illustrated. In the sub-field of software, applications, development languages, development packages, network environments, operating systems, and systems management are illustrated. By way of example, the business sub-field management is further expanded to show more specific employment categories including account executive, manager, retail manager, vice president and director. As illustrated, each of these more specific employer categories may include a list of jobs as illustrated under the account executive specific employment category.

Figures 18, 19:
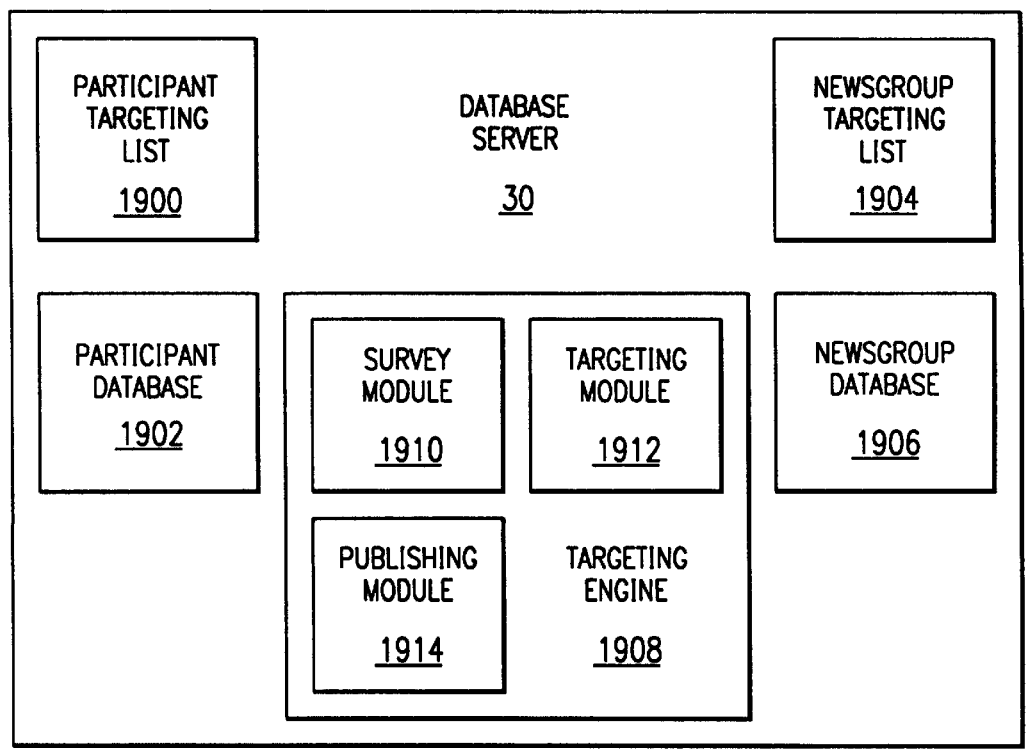
FIG. 18 illustrates one embodiment of a job posting form that may be used by an employer to specify desired candidate qualifications for a described employment position.
FIG. 19 illustrates one embodiment of a database server used in the system of FIG. 1.

FIG. 18 illustrates one embodiment of a job posting form 1800 that may be used by an employer to specify desired candidate qualifications for a described employment position, referred to generally as job criteria. For example, job posting form 1800 may include a job title, a job description, and a status as to whether the job is a full time or part time position. Job form 1800 may also include weighted fields for entering weighted skills such as required skills 1802 and preferred skills 1804. Other fields or indicators may me used to further weight particular skills or other candidate qualification data through the selection of keywords corresponding to predetermined weighting schemes, or by the entry of a number or other variable specifying the weight to be assigned to a particular item of candidate qualification data. Job posting form 1800 may further include soft skills that may not necessarily be qualitatively evaluated, but nevertheless are seen by the employer as a skill desirable for the posted position. Examples of further job criteria include such data as years of experience or degree required, specific areas or fields of competency, technical certifications, and geographic areas where a position is being offered. Job posting form 1800 may also include a posted salary range, educational requirements, and the geographical locations where the position is available. Job posting form 1800 may also specify the length of any contract for which a position is being filled, and a "date posted" that corresponds to the date the employer actually submits the job posting form for posting by system 10. It should be noted that an employer may fill out additional fields included in job posting form 1800 that are not illustrated in FIG. 18. For example, an employer may specify that a particular job posting only be active until a particular expiration date. Job posting form 1800 may also have several additional fields that are not viewable by a candidate upon review of the job posting, but are viewable by a recruiter to further meet the needs of the employer for the particular job posting. For example, an employer may provide a note to a recruiter requesting that the employer be referred only candidates that have experience within a particular industry or at a specific company. Additionally, an employer may specify that a recruiter contact a specific person at the employer for any inquiries related to the job posting.

FIGS. 19 through 24 illustrate the use of system 10 as a job publishing system that targets particular newsgroups or individuals to receive communications of job postings based on characteristics of those newsgroups or individuals. For purposes herein, a newsgroup is a database or posting service accessible over one of communication links 35 or other connection. Newsgroups include, but are not limited to, traditional newsgroups, list services, web pages, bulletin boards, chat forums, subscription mailing lists, and usenet forums. Most of such services are categorized by subject area and organize articles and postings for participants to browse and review. Some are delivered directly to participants. Others are maintained at a host, central server or database to be accessed as needed or desired by their participants. In any case, users interested in a particular subject area may become participants, also referred to as subscribers, for a newsgroup directed towards that subject area. For example, an object-oriented programmer might be interested in newsgroups entitled comp.newproduct or comp.object. Comp.newproduct may be a moderated group that discusses new computer products. Such a categorization enables system 10 to easily locate and target potential job candidates who have a particular background or expertise. Rather then sifting through thousands of resumes of potentially less-qualified people who are out actively searching for a job, system 10 can instead focus on small groups of highly motivated individuals who actively discuss advancements and techniques in a particular field. Further, when text based searching of postings for a particular newsgroup is performed, the small group can be further refined to include individuals with specific knowledge of a particular aspect of the field, or individuals who have achieved a particular degree, certification, qualification, or position. A whole world of potential candidates can therefore be reduced to two or three individuals who are best suited for a particular position. The individuals can then be ranked as previously described and directly targeted either through posting to a particular newsgroup or by direct solicitation via electronic mail.

FIG. 19 illustrates one embodiment of database server 30. In the illustrated embodiment, database 30 includes a participant targeting list 1900, a participant database 1902, a newsgroup targeting list 1904, a newsgroup database 1906, and a targeting engine 1908.

Targeting engine 1908 may be any combination of hardware and/or software operable to select participants and newsgroups at which to target a particular job posting and generate a mailing or posting in order to notify the participants or newsgroups of the job opening. In one embodiment, targeting engine 1908 includes a survey module 1910, a targeting module 1912, and a publishing module 1914.

Survey module 1910 includes suitable algorithms, routines, and user interfaces necessary to, either automatically or in response to user inputs, obtain the addresses, posting requirements and newsgroup characteristics of surveyed newsgroups that match predetermined selection criteria. Survey module 1910 similarly retrieves the electronic mail addresses and participant characteristics of participants in newsgroups whose postings to the newsgroups match predetermined selection criteria. Newsgroup characteristics and participant characteristics are referred to collectively as target characteristics. Survey module 1910 uses the retrieved data to create new entries or update existing entries in either participant database 1902 or newsgroup database 1906.

In one embodiment, survey module 1910 includes suitable algorithms, routines, and user interfaces in order to survey websites on a network such as the Internet for candidates advertising their qualifications using, for example, on-line resumes that are stored on a home page. In such an embodiment, survey module 1910 may include search engines, agents, mobile objects, self-executing routines, or any other technology capable of searching websites according to selected criteria. For example, a mobile agent or automated search engine may be used wherein terms such as, for example, resume, curriculum vita, and job history can be searched on the Internet. Webpages associated with such terms can then be downloaded, candidate qualification data parsed or extracted, and candidate records 108 automatically generated for a candidate who is associated with the webpage. All technical terms included, for example, in a candidate's resume, can be listed in candidate records 109, together with position titles, education, work history, or any other candidate qualification data discussed herein. In another embodiment, survey module 1910 can be utilized in the same manner to search the Internet for webpages that include job postings or announcements. In such an embodiment, websites can again be searched for terms indicative of job postings such as, for example, positions available, job listings, job announcements, openings, employment opportunities, or other suitable terms. Such job postings can then be downloaded and job criteria extracted in order to automatically generate job posting records 124. In either case, survey module 1910 can be used to create records that correspond to thousands of resumes and job postings available on the Internet each day, with such records being integrated into system 10 to drastically increase the pool of candidates and available jobs. In either embodiment, routines can be utilized to look for particular job openings or candidates matching particular retrieval criteria. Likewise, routines can be designated to perform surveying at any programmed interval, or when current records of system 10 drop below a predetermined number. A source, server, host, company, or and/or URL associated with the web page that is the source of each of the individual records can be included in a separate field within candidate records 108 or job posting records 124. Records 108 or 124 that are retrieved by survey module 1910 may be stored in candidate record database 102, job posting records database 124, or any other suitable database.

Databases 1902 and 1906 are targeting databases that store the retrieved data that is described above in records for each target of system 10, whether that target is a newsgroup or a newsgroup participant. For example, participant database 1902 may store a participant identifier, a participant electronic mail address, and participant characteristics such as a participant Internet Protocol address, a list of known newsgroups to which the participant subscribes or posts, a list of technical terms used in either participant's postings or newsgroups to which participant subscribes, and any background information, positions held, job titles, or other suitable information useful for evaluating the talents of a particular participant. Newsgroup database 1906 may contain similar information such as a newsgroup identifier, the newsgroup's domain address, a Uniform Resource Locator, an electronic mail address of the newsgroup subscription and/or posting queue, and newsgroup characteristics such as the title of the newsgroup, header information of the newsgroup, posting requirements or restrictions of the newsgroup, contents of newsgroup postings, technical terms used in postings to that newsgroup, and statistical and subscriber data associated with the newsgroup. Both databases 1902 and 1906 may also contain status information for each newsgroup or participant entry relative to system 10. For example, each entry may include a record of any postings, together with content, dates and times, previously initiated to the participant or newsgroup. The entry may also include a record of feedback received as a result of previous postings to such participant or newsgroup.

Targeting module 1912 generates participant targeting list 1900 and newsgroup targeting list 1904 for a particular job posting in response to comparing the requirements of the job posting to characteristics of entries for newsgroups or newsgroup participants listed in newsgroup database 1906 or participant database 1902, respectively. Targeting module operates similarly to candidate matching module 38 described in FIGS. 1 and 3, comparing entries stored in databases 1902 and 1906 to the job criteria of a job posting. Those meeting match criteria are added to participant targeting list 1900 or newsgroup targeting list 1904 for posting by publishing module 1914.

Publishing module 1914 is an automated publishing module operable to generate a job notice in the form of an electronic mail message or newsgroup posting for a particular job posting. Publishing module 1914 includes a scheduler that can be utilized to publish a job notice to particular candidate electronic mail addresses or newsgroup addresses at a particular time and/or repeated at a particular interval. Further operation of modules 1910, 1912 and 1914 are described in greater detail with regard to FIGS. 20–24.

FIG. 20 is a flow chart illustrating a method for targeting mailings of job postings to particular job candidates. The method begins at step 2002, where a job posting is received by system 10. In step 2004, system 10 accesses newsgroup database 1906. In step 2006, job criteria included in the posting are compared by targeting module 1912 to characteristics of each newsgroup that is listed in newsgroup database 1506. In step 2008, targeting module 1912 next selects a newsgroup identifier if at least one characteristic of the newsgroup associated with the newsgroup identifier meets at least one job criterion of the job posting. At step 2010, targeting module 1912 adds any selected newsgroup identifiers to newsgroup targeting list. At step 2012, a newsgroup targeting process is conducted by publishing module 1914 to post the job posting at a newsgroup address associated with the selected newsgroup identifier.

FIG. 21 is a flowchart that illustrates a method for analyzing newsgroups and building newsgroup database 1906. Generally, newsgroups are associated with a variety of newsgroup data items that are useful for targeting job candidates, and that are extracted for use in newsgroup database 1906. Such newsgroup data items include, for example, a newsgroup identifier and newsgroup characteristics. Newsgroup characteristics include, for example, information regarding the forum of the newsgroup, or members who may participate in that forum. In particular, newsgroup characteristics may include the identity of sponsors, physical and/or Internet addresses of a host server, whether postings such as job postings may be sent to the newsgroup, and content information of the newsgroup such as a newsgroup name, posted subject matter, header information, a description of the newsgroup, the content of postings to the newsgroup, and the identity of, or physical, electronic mail, or Internet Protocol addresses of, newsgroup participants.

The process for building newsgroup database 1906 begins at step 2102, where survey module 1910 accesses a managing host. The managing host represents a location or resource where newsgroups may be found, and may be a newsgroup host server, a web page, a newsgroup index, or any other access point for newsgroups. The managing host is accessible over communication links 35 or via other dedicated or dial-up connection to the server operating as the managing host.

At step 2104, survey module 1910 polls newsgroups on the managing host. Survey module 1910 selects a particular newsgroup if the newsgroup meets retrieval criteria at step 2106. If selected, the newsgroup is included in a newsgroup build list that is later used to add newsgroup data to newsgroup database 1906. The retrieval criteria may include, for example, whether the newsgroup accepts postings such as job postings, is identifiable by vocational area, or is not already in newsgroup database 1906. Alternatively or additionally, retrieval criteria may be based on any information that may be included or associated with the newsgroup database. Such retrieval criteria aids in reducing later processing of undesirable newsgroups, and may change from time to time during the lifetime of system 10. Survey module 1910 will poll the newsgroups until survey module 1910 selects all newsgroups on the managing host that meet the retrieval criteria.

In step 2108, a newsgroup entry or record is generated for each newsgroup listed in the newsgroup build list. To generate this newsgroup entry, survey module 1910 parses data from each listed newsgroup to obtain newsgroup characteristics required to target job candidates via that particular newsgroup. For example, as a newsgroup is listed in the newsgroup build list, survey module 1910 may determine a newsgroup address, generate a newsgroup identifier, and parse other newsgroup characteristics from the newsgroup for inclusion in the newsgroup entry. Newsgroup characteristics may be: encoded in the text of subscription information associated with the newsgroup address; included within header information, metatags, or web pages containing links to the newsgroup; or directly extracted from posting headers, posting message bodies, list of subscribers or participants, or other suitable sources of information. Newsgroup characteristics include data extracted from a newsgroup that may be useful for job targeting. Newsgroup characteristics may include, for example, vocational and geographical information. Vocational information such as the particular technological area may be revealed by the name of a newsgroup in addition to being encoded in other sources of data as described above. Geographical, institutional, or other types of information may be revealed by a domain name of a server or host of a particular newsgroup.

In step 2110, each generated newsgroup is categorized and indexed in step 2110 within newsgroup database 1906. System 10 may, for example, categorize each newsgroup according to the newsgroup characteristics parsed in step 2108. For example, newsgroup record may include a list of newsgroup keywords generated in step 2108. Each newsgroup keyword corresponds to a particular characteristics of the newsgroup that was parsed in step 2108. A particular newsgroup may, for example, have multiple keywords associated with each of geography, technological area, posting requirements, and the identity and/or characteristics of newsgroups subscriber that post to the particular newsgroup. Thus, when newsgroup record is categorized and indexed in step 2110, the particular newsgroup maybe cross-referenced within numerable entries organized by a particular geographic area, technological field, or any other extractable characteristic commonly obtained from the selection and generation process described in steps 2106 and 2108.

Newsgroup identifiers may be generated for listing using, for example, a hypertext link that is selectable to access a particular newsgroup. For example, newsgroup database 1906 may include a newsgroup map of all currently available newsgroups that is categorized and indexed using keywords from all newsgroup entries or records included in newsgroup database 1906. Each newsgroup record that includes a keyword corresponding to, for example, Java, may be listed under a newsgroup map category of Java within a general map category of technological area. All newsgroup records listed under the Java index in category would be listed by a newsgroup identifier embodied, for example, in a hypertext link allowing selectable access to the newsgroup record. Thus, a particular newsgroup record may have multiple newsgroup identifiers listed throughout a newsgroup map found in newsgroup database 1906. Such identifiers may be listed under geographic, technical, or any other general categories within newsgroup database 1906.

FIG. 22 is a flow chart illustrating a method used to select a newsgroup as a target for a particular job posting, as discussed generally in reference to FIG. 20. Selecting a newsgroup begins at step 2202, where database server receives a job posting for publishing.

In step 2204, targeting module 1912 processes the job posting to determine at least one job criterion. The job posting will likely include a number of job criteria such as those described in reference to FIG. 18, some of which may be required candidate qualifications for job candidacy. Targeting module 1912 uses at least one job criterion to target job candidates or newsgroups.

After targeting module 1912 has determined at least one job criterion, targeting module 1912 accesses newsgroup database 1906 in step 2206. In step 2208, the job criteria of the job posting is compared to newsgroup characteristics of each newsgroup record in newsgroup database 1906. Targeting module 912 selects each newsgroup that has characteristics meeting the job criterion at step 2210. For example, if a job criterion specializes a particular technical area such as Java, system 10 may select each newsgroup that has a newsgroup identifier listed under the indexing category of Java. However, a particular job posting may also have an additional job criterion restricting job applicants to those who currently live in the city of Dallas, Tex. In such an instance, the newsgroups that have a newsgroup identifier listed under the indexing category of Java may be cross referenced with those newsgroups having a newsgroup identifier listed under the geographic area of Dallas, Tex., in order to form a smaller subset of newsgroups for actual job targeting. System 10 may also deselect or not permit selection of a newsgroup if the newsgroup does not accept job postings or has other unacceptable requirements.

According to another aspect of this invention, system 10 can determine whether newsgroup identifiers meet job criterion by a preset level, such as an exact keyword match, or within a certain threshold. Such a threshold could be met by keywords that are similar to keywords found in job criterion, or by an experience level that is within a certain acceptable percentage to the potential employer. These and other parameters may vary during operation of targeting module 1912. For example, should no matches be found for a job posting in a given period of time, targeting module 1912 could relax the threshold for determining whether newsgroups meet the job criteria. For example, targeting module 1912 may expand selection to include newsgroups that are associated with only five of six required candidate qualifications, that are listed as job criteria for a particular job posting, if only a limited number of newsgroups are associated with all six. Such relaxing of the threshold increases the probability that a job candidate will be found for the job posting. This or a similar technique can also be used to perform the candidate matching performed by candidate matching engine 38 of FIGS. 1 and 3 that is described in the flowchart of FIG. 16.

In the illustrated embodiment, after targeting module 1912 has selected all appropriate newsgroups, newsgroup identifiers and newsgroup addresses for each selected newsgroup, an entry for each selected newsgroup is added to newsgroup targeting list 1904 in step 2212. Next, in step 2214, targeting module 1912 sends the job posting to newsgroup addresses associated with newsgroup identifiers included in newsgroup targeting list 1904 at step 2212. Sending the job posting to the selected newsgroup targets the entire population participating in such a newsgroup, which may be desirable with some job postings. Targeting module 1912 can also target individuals in a similar manner in another embodiment, described in more detail in reference to FIG. 23.

Figure 23:
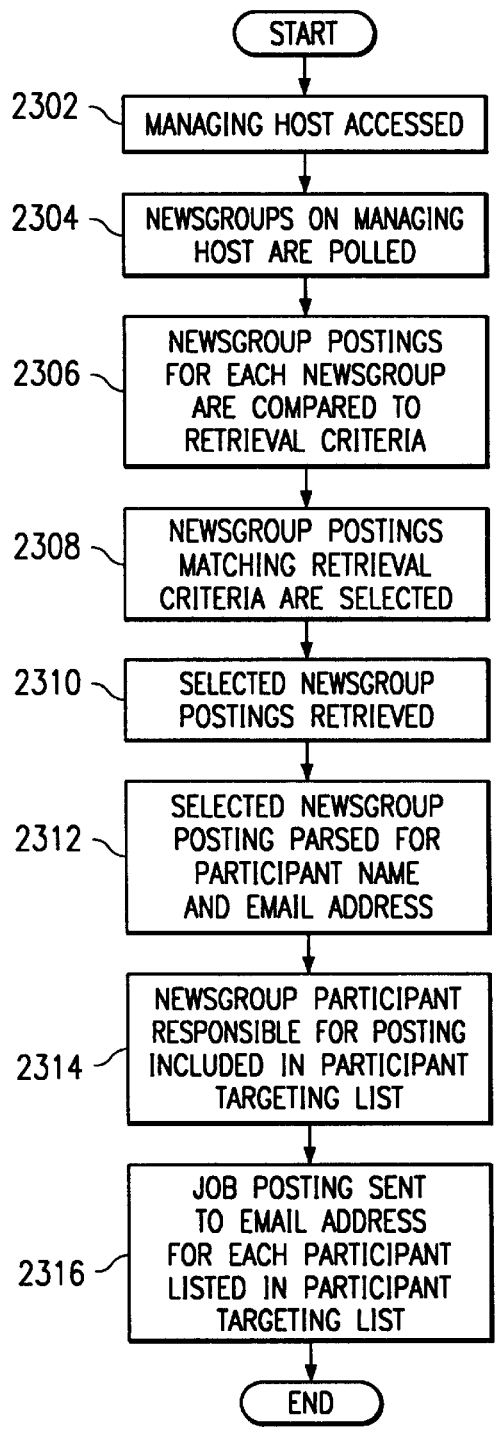
FIG. 23 is a flow chart illustrating another method using the teachings of the present invention to select a newsgroup participant as a target for a job posting.

FIG. 23 is a flow chart illustrating another method of selecting a newsgroup participant as a target for a job posting. This process begins at step 2302, where survey module 1910 accesses a managing host. At step 2304, survey module 1910 polls newsgroups on a managing host to review newsgroup postings. Newsgroup postings of each newsgroup are compared to retrieval criteria previously discussed in step 2306 in order to determine if characteristics of the posting or newsgroup participant authoring the posting, collectively referred to as participant characteristics, meet such criteria. At step 2308, survey module 1910 selects a newsgroup posting if the participant characteristics meet the retrieval criteria. Participant characteristics may be based on newsgroup data as described in conjunction with FIG. 21, or based on data included or associated with individual newsgroup postings. Such data may include, for example, whether the newsgroup posting is new since the last review of the newsgroup by survey module 1910, or whether the newsgroup posting is identifiable by geographic or vocational area. For example, the newsgroup posting may include a physical address in the text, or indicate a domain name of a recognizable institution or company. A posting may also contain words or terms that are associated with retrieval criteria. In one embodiment, retrieval criteria may be generated from an individual job posting received by system 10 for publishing.

Additional data in a newsgroup posting may reveal areas of competency or expertise of the authors for inclusion as participant characteristics. For example, a newsgroup posting may include a closing from "Dr. John Doe, Sr. Director of Electrical Engineering". Such a closing probably indicates that the newsgroup participant associated with the newsgroup posting has a certain level of formal education, and presumably expertise in both the application and management of electrical engineering technology. Collecting and comparing participant characteristics to retrieval or job criteria aids in reducing processing of undesirable newsgroup postings. Survey module 1910 may poll the newsgroup until survey module 1910 selects all newsgroup postings that meet the retrieval criterion.

At step 2310, survey module 1910 retrieves selected newsgroup postings, each associated with a newsgroup participant. Publishing module 1914 parses an address for the newsgroup participant associated with each newsgroup posting at step 2312. In step 2314, a participant identifier and participant electronic mail address for each selected newsgroup posting is included within participant targeting list 1900. In one embodiment, a participant identifier may be included within participant targeting list 1900 and linked to an electronic mail address corresponding to the participant in a separate participant email index. In step 2316, publishing module 1914 then sends the job posting to the address associated with each newsgroup participant that was parsed at step 2312. In this embodiment, the address associated with each newsgroup participant is a standard email address, however other addresses or communications methods available that are known to be associated with a participant may be used.

Although FIG. 23 is described in such a manner that newsgroup participants meeting retrieval criteria are directly included in the candidate targeting list and then sent job postings all within the same process flow, a participant record may be generated for each newsgroup participant and similarly categorized and indexed within participant database 1902 as is described in the process of FIG. 21. Thus, system 10 may maintain an index of participant records that are categorized or otherwise indexed using, for example, participant characteristics such as technical areas, background, or geography. Thus, instead of polling newsgroups to generate participant targeting list 1900 for each job posting that is designated for job targeting directly to participants, participant database 1902 may instead be periodically updated and system 10 may instead simply reference the candidate records included within the participant database 1902 to determine appropriate participants for inclusion in participant targeting list 1900 in order to publish particular job postings.

Figure 24:
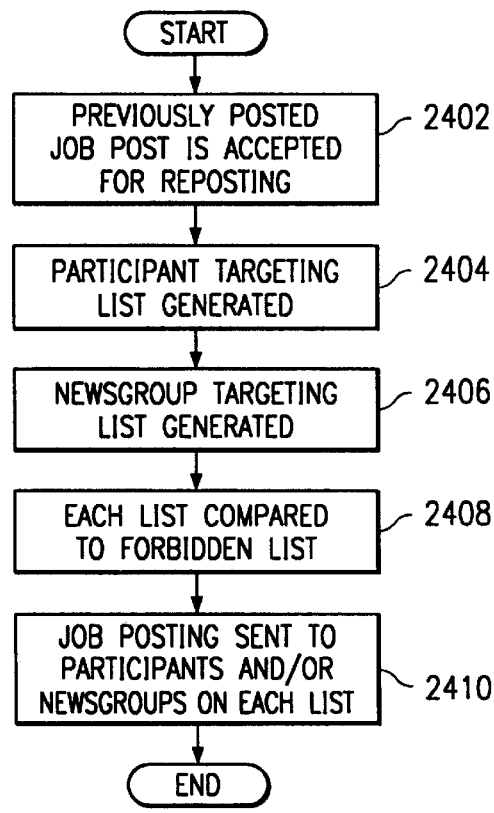
FIG. 24 is a flowchart illustrating one method used to repost job postings to selected addresses.

System 10 may also automatically monitor reposting of job postings to appropriate mailing addresses. FIG. 24 is a flowchart illustrating one method used to repost job postings to selected addresses. System 10 determines whether a job posting needs to be reposted at step 2402.

System 10 may automatically repost each job posting at a reposting interval that may change from time to time, or may vary the reposting interval by job posting. In addition, a job posting may need to be reposted for other reasons. For example, a job posting may not have received a sufficient number of responses, and/or new newsgroups or newsgroup participants that may represent new candidates may now be available.

If a particular job posting needs to be reposted, system 10 determines where to send the job posting. System 10 may either repost a job posting to addresses to which the job posting was originally sent, or search for new newsgroup identifiers or newsgroup participants to which job posting should be sent. If a job posting should be sent to new addresses, in step 2404 system 10 selects new addresses associated with newsgroup identifiers to be included in newsgroup targeting list by following the steps illustrated and discussed in conjunction with FIG. 22. If a job posting should be sent to new addresses associated with newsgroup participants, in step 2406 system 10 selects these new addresses to be included in a candidate targeting list by following the steps illustrated and discussed in conjunction with FIG. 23. System 10 then determines whether it can repost to each selected address at step 2408. System 10 may not repost a job posting to a selected address if, for example, a newsgroup or newsgroup participant does not permit postings such as job postings, has requested that job postings not be posted, or if it has been determined that the newsgroup or candidate is no longer appropriate for job postings. Finally, system 10 sends the job posting to selected addresses on each list at step 2410.

It may be desirable to perform such steps as illustrated in FIGS. 20–24 from time to time by batch processing, or whenever required by a new job posting. Also within the scope of the invention are other embodiments of the invention that do not include the steps for building and updating newsgroup database 1906. For example, system 10 may access a newsgroup identifier from newsgroup database 1906 comprising a list or subscription of newsgroup addresses that have already been categorized and indexed. Such a list or subscription may be purchased, for example, in a CD-ROM format.

Although the present invention has been described in detail, it should be understood that various changes, substitutions and alterations can be made hereto without departing from the spirit and scope of the invention as defined by the appended claims.

What is claimed is:

1. A system for automated candidate recruiting using a network, the system comprising:
   a candidate web engine operable to communicate with the network and to present a candidate survey form to a client of the network, the candidate web engine further operable to receive candidate qualification data from the client that is entered in the form; and
   a candidate mapping engine in communication with the candidate web engine, the candidate mapping engine operable to receive the candidate qualification data from the candidate web engine and generate at least one candidate identifier in response to parsing the candidate qualification data, the candidate mapping engine further operable to index the at least one candidate identifier in response to the parsed candidate qualification data, the at least one candidate identifier being linked to a candidate record, the candidate record storing the candidate qualification data, wherein the candidate record includes a status field, the status field being updated by the candidate mapping engine in response to a recruiting event.

2. The system of claim 1, and further comprising a candidate matching engine, the candidate matching engine operable to match the candidate qualification data to job criteria of a job posting.

3. The system of claim 1, and further comprising a filter engine in communication with the candidate web engine and the candidate mapping engine, the filter engine operable to control communication of the candidate qualification data between the candidate web engine and the candidate mapping engine.

4. The system of claim 1, and further comprising a graphical candidate map, the graphical candidate map having categories corresponding to candidate qualifications, the candidate mapping engine operable to index the at least one candidate identifier in the graphical candidate map by assigning the at least one candidate identifier to one of the categories in response to comparing the candidate qualification corresponding to the one category to the parsed candidate qualification data.

5. The system of claim 1, wherein the candidate mapping engine further includes a candidate review template, and wherein the candidate mapping engine is operable to:
  map candidate qualification data from the candidate record to fields of the candidate review template;
  communicate the candidate review template to a client of the network; and
  modify qualification data in the candidate record in response to receiving modification s to the fields of the candidate review template.

6. The system of claim 3, wherein the filter engine includes a list of minimum candidate requirements, and wherein the filter engine transfers the candidate qualification data from the candidate web engine to the candidate mapping engine in response to comparing the candidate qualification data to the list of minimum candidate requirements.

7. The system of claim 4, wherein the candidate survey form includes at least one field of selectable inputs, each selectable input corresponding to the candidate qualification of a predetermined one of the categories of the graphical candidate map.

8. The system of claim 5, wherein the candidate mapping engine further includes a plurality of versions of the candidate review template, the candidate mapping engine determining a selected one of the plurality of versions to be communicated to a client of the network in response to an asserted identification of the client's user, each version displaying different fields of information associated with the candidate record.

9. A system for automated candidate recruiting using a network, the system comprising:
  a candidate web engine operable to communicate with the network and to present a candidate survey form to a client of the network, the candidate web engine further operable to receive candidate qualification data from the client that is entered in the form; and
  a candidate mapping engine in communication with the candidate web engine, the candidate mapping engine operable to receive the candidate qualification data from the candidate web engine and generate at least one candidate identifier in response to parsing the candidate qualification data, the candidate mapping engine further operable to index the at least one candidate identifier in response to the parsed candidate qualification data, the at least one candidate identifier being linked to a candidate record, the candidate record storing the candidate qualification data, wherein the candidate record includes a feedback field operable to store feedback data on a candidate.

10. A method of automated candidate recruiting over a network, the method comprising:
  parsing candidate qualification data from a candidate profile in response to receiving the candidate profile over the network;
  storing the received candidate profile in a candidate record, wherein the candidate record includes a status field and a feedback field, the status field being updated in response to a recruiting event, and the feedback field storing feedback data on a candidate;
  generating a plurality of candidate identifiers associated with the parsed candidate qualification data, each candidate identifier being linked to the candidate record;
  comparing the candidate qualification data to a candidate map; and
  assigning one of the candidate identifiers to a category of the candidate map in response to the compared candidate qualification data.

11. The method of claim 10, the method further comprising filtering the received candidate profile, and wherein parsing the candidate qualification data is in response to filtering the candidate profile.

12. The method of claim 10, and further comprising:
  receiving an input from a client of the network, the input selecting at least one candidate identifier from the candidate map; and
  updating a job posting record with a copy of the candidate identifier in response to receiving the input.

13. The method of claim 10, wherein generating a plurality of candidate identifiers comprises generating a candidate identifier for each item of parsed candidate qualification data.

14. The method of claim 10, and further comprising:
  receiving a job criterion associated with a job posting;
  comparing the job criterion to a candidate qualification associated with the category of the candidate map; and
  selecting each candidate identifier assigned to the category of the candidate map in response to comparing the job criterion.

15. The method of claim 13, wherein assigning one of the candidate identifiers further comprises assigning one of the candidate identifiers to a particular category of the candidate map that corresponds to one item of the parsed candidate qualification data.

16. The method of claim 14, wherein comparing the job criterion to a candidate qualification further comprises comparing the job criterion to a proficiency associated with the candidate qualification.

17. A system for automated candidate recruiting on a network, the system comprising:
  a computer-readable medium;
  a computer program encoded on the computer-readable medium, the computer program operable to be executed on a computer, the computer program further operable to:
    parse candidate qualification data in response to receiving a candidate profile;
    store the received candidate profile in a candidate record, wherein the candidate record includes a status field and a feedback field, the status field being updated in response to a recruiting event, and the feedback field storing feedback data on a candidate;
    generate a plurality of candidate identifiers associated with the parsed candidate qualification data, each candidate identifier being linked to the candidate record;
    compare the candidate qualification data to a candidate map; and
    assign each candidate identifier to one of a plurality of categories of the candidate map in response to the compared candidate qualification data.

18. The system of claim 17, wherein the computer program is further operable to:
  compare the parsed candidate qualification data to job criteria for a particular job posting; and
  select the candidate record in response to the compared candidate qualification data.

19. The system of claim 17, wherein the computer program is further operable to filter the candidate profile, and wherein the computer program parses the candidate qualification data in response to filtering the candidate profile.

20. The system of claim 17, wherein the computer program is further operable to:
  receive an input from a client of the network, the input selecting at least one candidate identifier from the candidate map; and
  update a job posting record with a copy of the candidate identifier in response to receiving the input.

21. The system of claim 17, wherein the computer program is further operable to generate a candidate identifier for each item of parsed candidate qualification data.

22. The system of claim 17, wherein the computer program is further operable to assign one of the candidate identifiers to one of the plurality of categories of the candidate map that corresponds to one item of the parsed candidate qualification data.

23. The system of claim 17, and wherein the computer program is further operable to:
  receive a job criterion associated with a job posting;
  compare the job criterion to a candidate qualification associated with one of the categories of the candidate map; and
  select each candidate identifier assigned to the one category of the candidate map in response to comparing the job criterion.

* * * * *